(12) United States Patent
Brandwine et al.

(10) Patent No.: US 11,522,896 B2
(45) Date of Patent: *Dec. 6, 2022

(54) MANAGING VIRTUAL COMPUTING TESTING

(71) Applicant: Amazon Technologies, Inc., Seattle, WA (US)

(72) Inventors: Eric Jason Brandwine, Haymarket, VA (US); Donald L. Bailey, Jr., Penn Laird, VA (US)

(73) Assignee: Amazon Technologies, Inc., Seattle, WA (US)

( * ) Notice: Subject to any disclaimer, the term of this patent is extended or adjusted under 35 U.S.C. 154(b) by 716 days.

This patent is subject to a terminal disclaimer.

(21) Appl. No.: 14/574,183

(22) Filed: Dec. 17, 2014

(65) Prior Publication Data

US 2015/0143527 A1 May 21, 2015

Related U.S. Application Data

(63) Continuation of application No. 12/981,322, filed on Dec. 29, 2010, now Pat. No. 8,918,785.

(51) Int. Cl.
*H04L 9/40* (2022.01)
*G06F 9/455* (2018.01)
(Continued)

(52) U.S. Cl.
CPC .......... *H04L 63/1433* (2013.01); *G06F 9/455* (2013.01); *G06F 21/305* (2013.01); *G06F 21/53* (2013.01); *G06F 21/577* (2013.01); *G06F 2009/45587* (2013.01); *G06F 2221/2101* (2013.01)

(58) Field of Classification Search
CPC ............ H04L 63/1433; G06F 9/45558; G06F 21/305; G06F 21/53; G06F 21/577; G06F 2009/45587; G06F 2221/2101
See application file for complete search history.

(56) References Cited

U.S. PATENT DOCUMENTS 6,088,801 A 7/2000 Grecsek
6,205,552 B1 3/2001 Fudge
(Continued)

OTHER PUBLICATIONS

Jim D. Hietala, Top Virtualization Security Mistakes (and How to Avoid Them) Aug. 2009.

*Primary Examiner* — Jorge A Chu Joy-Davila
(74) *Attorney, Agent, or Firm* — Knobbe, Martens, Olson & Bear, LLP

(57) ABSTRACT

Systems, methods, and interfaces for the management of virtual machine instances and other programmatically controlled networks are provided. The hosted virtual networks are configured in a manner such that a virtual machine manager of the virtual network may monitor activity such as user requests, network traffic, and the status and execution of various virtual machine instances to determine possible security assessments. Aspects of the virtual network may be assessed for vulnerabilities at varying levels of granularity and sophistication when a suspicious event or triggering activity is detected. Illustrative embodiments of the systems and methods may be implemented on a virtual network overlaid on one or more intermediate physical networks that are used as a substrate network.

19 Claims, 18 Drawing Sheets

(51) Int. Cl.
    *G06F 21/30*     (2013.01)
    *G06F 21/53*     (2013.01)
    *G06F 21/57*     (2013.01)

(56) References Cited

U.S. PATENT DOCUMENTS

| | | |
|---|---|---|
| 8,161,479 B2 | 4/2012 | Sedukhin et al. |
| 8,225,317 B1 | 7/2012 | Chiueh et al. |
| 8,533,778 B1 | 9/2013 | Dalcher |
| 9,424,430 B2 | 8/2016 | Rosenan |
| 2003/0033541 A1 | 2/2003 | Edmark |
| 2007/0204166 A1 | 8/2007 | Tome |
| 2009/0119776 A1* | 5/2009 | Palnitkar ............... G06Q 20/40 726/25 |
| 2009/0282479 A1 | 11/2009 | Smith |
| 2010/0115621 A1 | 5/2010 | Staniford et al. |
| 2010/0125911 A1 | 5/2010 | Bhaskaran |
| 2010/0175108 A1 | 7/2010 | Protas |
| 2010/0251238 A1* | 9/2010 | Schuba ............... G06F 9/45558 718/1 |
| 2010/0316012 A1 | 12/2010 | Staniford et al. |
| 2011/0141124 A1 | 6/2011 | Halls et al. |
| 2011/0142053 A1 | 6/2011 | Van Der Merwe et al. |
| 2011/0153553 A1 | 6/2011 | Klotz |
| 2011/0239291 A1 | 9/2011 | Sotka |
| 2011/0243553 A1 | 10/2011 | Russell |
| 2012/0072968 A1 | 3/2012 | Wysopal et al. |
| 2013/0086582 A1 | 4/2013 | Cardona |
| 2013/0097701 A1 | 4/2013 | Moyle et al. |
| 2014/0143863 A1 | 5/2014 | Deb et al. |

\* cited by examiner

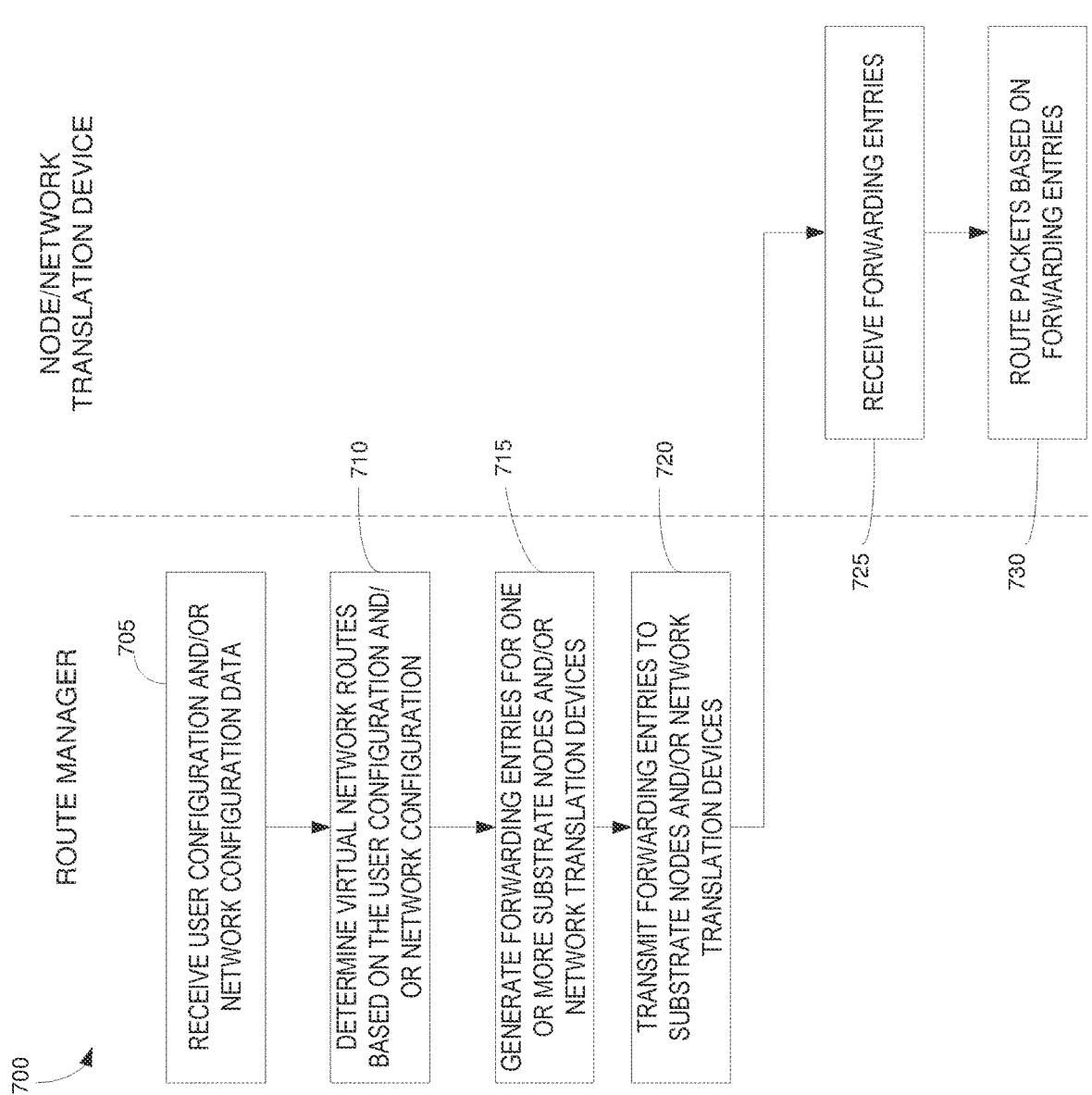

MANAGING VIRTUAL COMPUTING TESTING

This application is a continuation of U.S. patent application Ser. No. 12/981,322, entitled MANAGING VIRTUAL COMPUTING TESTING, and filed Dec. 29, 2010, the entirety of which is incorporated herein by reference.

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, a single physical computing device can create, maintain, delete, or otherwise manage virtual machines in a dynamic matter. In the simplest embodiment, users can request single computing device computer resources from a data center. In more complex embodiments, users, such as system administrators, can request the configuration of virtual machine instances corresponding to a desired set of networked computing devices. In such embodiments, the data center can implement varying number of virtual machine instances to implement the functionality and configuration of the requested physical computing device network.

One advantage of virtualization technology is that it allows for visibility into the status and configuration of the hosted virtual machine network. Modern networks are often distributed systems, lacking a single management entity with the ability to directly monitor network devices and traffic. This lack of central oversight can lead not only to the waste of network resources through overbroad vulnerability scanning and compliance measures, but can cause potentially problematic network events and changes in configuration to go unnoticed. In contrast, a virtual machine network can provide visibility into the operation and status of the virtual network. This increased transparency can lead to greater opportunities for network management, particularly in the area of network security.

BRIEF DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 7A illustrates a flow diagram for a process of propagating virtual routes to a substrate network;

DETAILED DESCRIPTION

Figure 1:
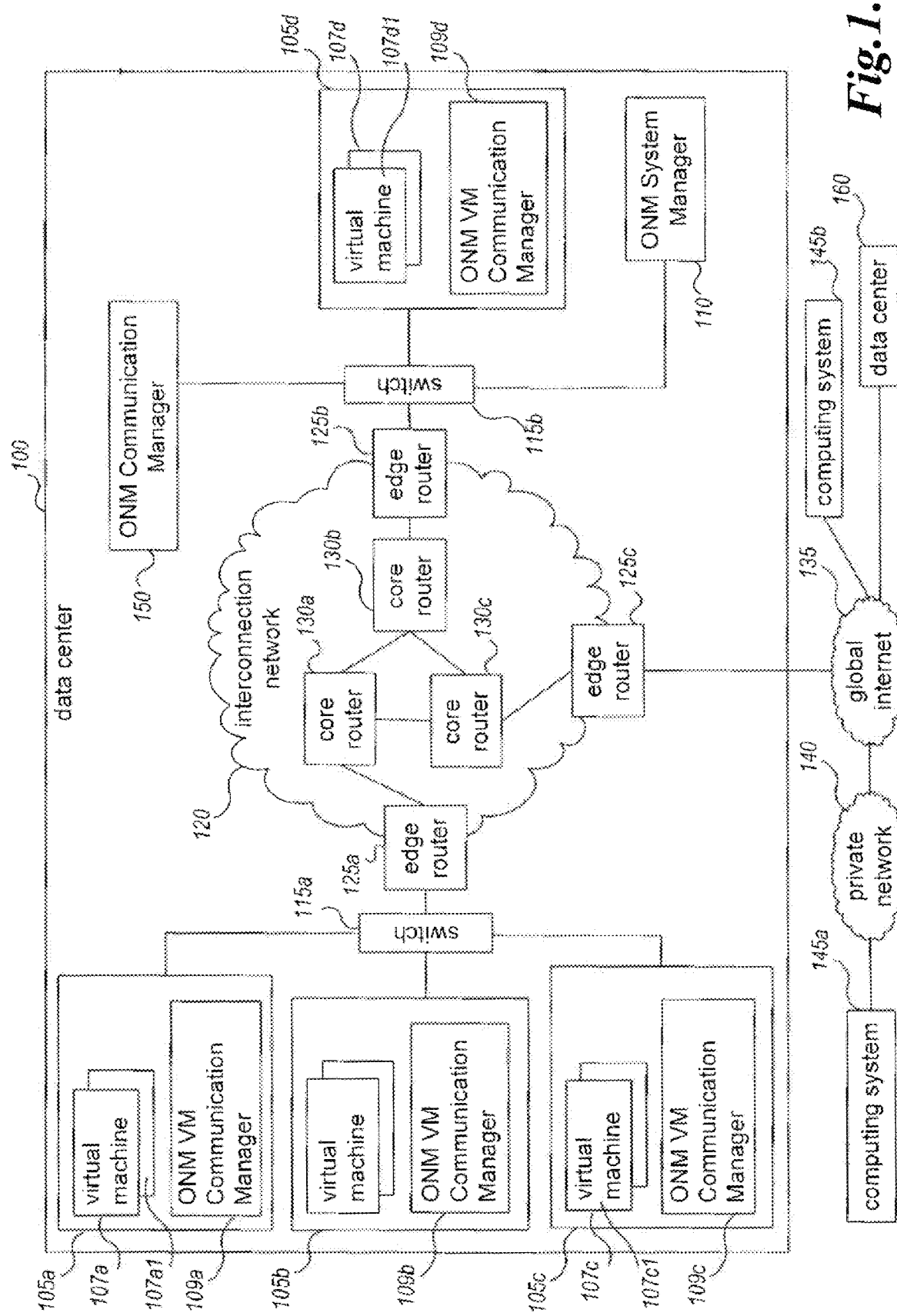
FIG. 1 is a block diagram illustrating an embodiment of a substrate network having computing nodes associated with a virtual computer network.

Generally described, aspects of the present disclosure relate to the management of virtual machine instances and other programmatically controlled networks. Specifically, embodiments of network data transmission analysis systems and methods are disclosed for managing security assessments of hosted virtual machine networks. Illustrative embodiments of the systems and methods may be implemented on a virtual network overlaid on one or more intermediate physical networks that are used as a substrate network. The hosted virtual machine networks are configured in a manner such that a virtual machine manager component may monitor activity such as user requests, network traffic, and the status and execution of various virtual machine instances to determine possible security assessments, such as vulnerabilities. The virtual machine manager component may determine a variety of assessment events on the basis of these user requests and virtual machine network activities. When an assessment event or triggering activity is detected, aspects of the virtual network may be assessed or scanned for vulnerabilities at varying levels of granularity and sophistication.

In one embodiment of the invention, a security assessment may be performed subsequent or simultaneous to a virtual machine instance execution in order to determine whether the execution has introduced or contributed to system vulnerabilities. In another embodiment of the invention, the virtual machine manager may delay execution of an activity or request for execution until after a security assessment is performed. In still another embodiment of the invention, the virtual machine manager may instantiate and cause the performance of a security assessment on a new set of virtual machine instances with a similar configuration to existing virtual machine instances in order to avoid disrupting the operation of a virtual network. Additionally, under various embodiments of the invention the virtual machine manager may be configured to prevent, delay, or reverse the execution of a virtual machine network activity or request for execution pending the results of a security assessment.

The following section discusses various embodiments of illustrative managed networks for network data transmission analysis. Following that is further discussion of network analysis systems and methods that can configure and implement virtual network security assessments. Accordingly, the description of the managed networks for network data transmission is included for purposes of illustrative embodiments and examples and should not be construed as limiting.

Managed Computer Networks for Network Data Transmission Analysis

With the advent of virtualization technologies, networks and routing for those networks can now be simulated using commodity hardware components. For example, virtualization technologies can be adapted to allow a single physical computing machine to be shared among multiple virtual networks by hosting one or more virtual machines on the single physical computing machine. Each such virtual machine can be a software simulation acting as a distinct logical computing system that provides users with the illusion that they are the sole operators and administrators of a given hardware computing resource. In addition, as routing can be accomplished through software, additional routing flexibility can be provided to the virtual network in comparison with traditional routing. As a result, in some implementations, supplemental information other than packet information can be used to determine network routing.

Aspects of the present disclosure will be described with regard to illustrative logical networking functionality for managed computer networks, such as for virtual computer networks that are provided on behalf of users or other entities. In at least some embodiments, the techniques enable a user to configure or specify a network topology, routing costs, routing paths, and/or other information for a virtual or overlay computer network including logical networking devices that are each associated with a specified group of multiple physical computing nodes. For example, a user (e.g., a network administrator for an organization) or service provider may configure a virtual or overlay network based on detected events, processing criteria, or upon request. With the network configuration specified for a virtual computer network, the functionally and operation of the virtual network can be simulated on physical computing nodes operating virtualization technologies. In some embodiments, multiple users or entities (e.g. businesses or other organizations) can access the system as tenants of the system, each having their own virtual network in the system. In one embodiment, a user's access and/or network traffic is transparent to other users. For example, even though physical components of a network may be shared, a user of a virtual network may not see another user's network traffic on another virtual network if monitoring traffic on the virtual network.

Figure 2:
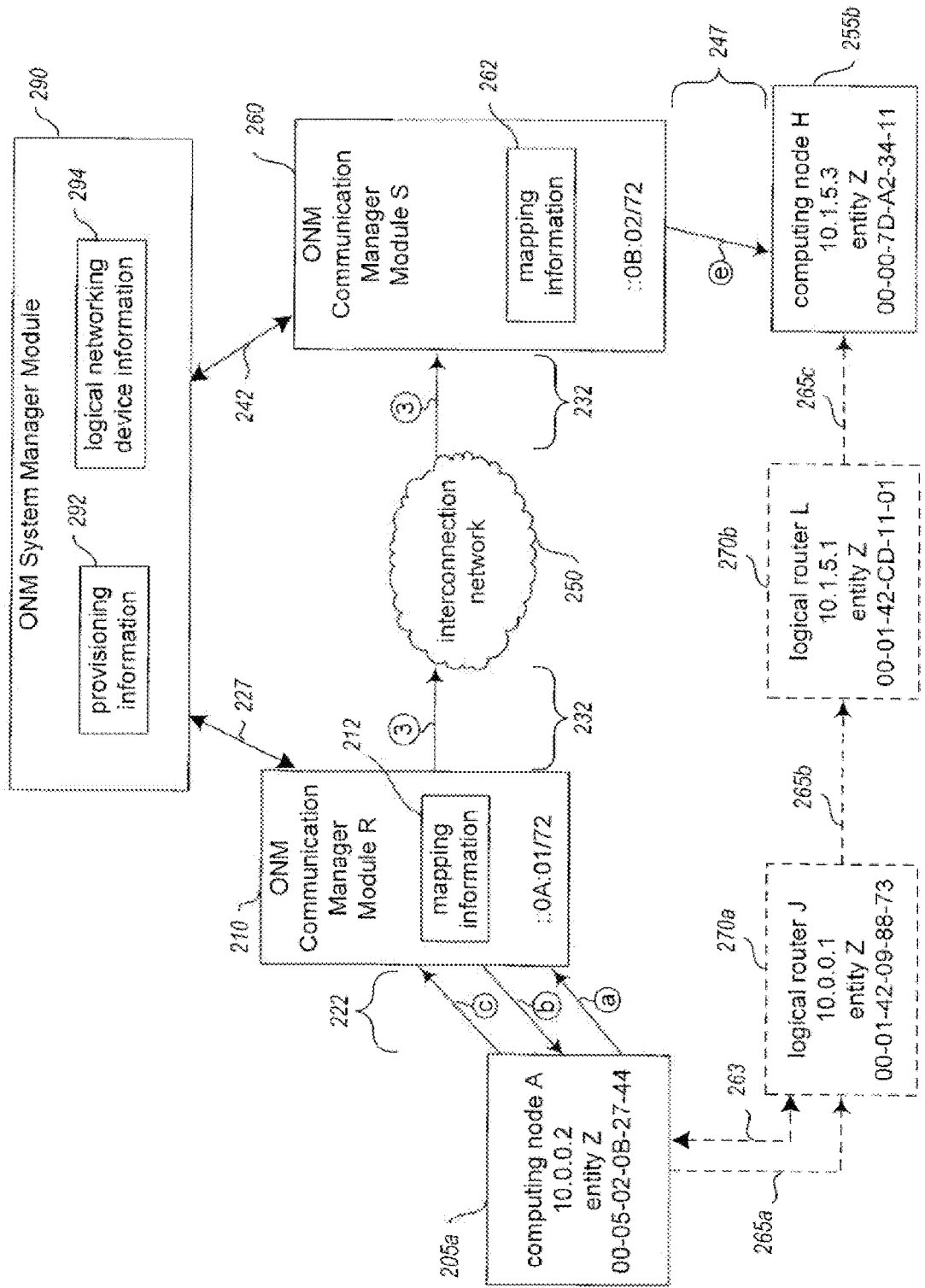
FIG. 2 is a block diagram of the substrate network of FIG. 1 illustrating logical networking functionality.

By way of overview, FIGS. 1 and 2 relate to embodiments where communications between multiple computing nodes of the virtual computer network emulate functionality that would be provided by logical networking devices if they were physically present. In some embodiments, some or all of the emulation are performed by an overlay network manager system. FIGS. 2-4B and 7B relate to embodiments where substrate routing decisions can be made independently of any simulated routing in the overlay network, allowing, for example, optimization of traffic on the substrate network based on information unavailable to a virtual network user. FIGS. 5A-7A relate to embodiments where routing decisions implemented on the virtual or overlay network are propagated to the substrate network. As previously discussed, one skilled in the relevant art will appreciate, however, that the disclosed virtual computer network is illustrative in nature and should not be construed as limiting.

Overlay Network Manager

FIG. 1 is a network diagram illustrating an embodiment of an overlay network manager system (ONM) for managing computing nodes associated with a virtual computer network. Virtual network communications can be overlaid on one or more intermediate physical networks in a manner transparent to the computing nodes. In this example, the ONM system includes a system manager module 110 and multiple communication manager modules 109a, 109b, 109c, 109d, 150 to facilitate the configuring and managing communications on the virtual computer network.

The illustrated example includes an example data center 100 with multiple physical computing systems operated on behalf of the ONM system. The example data center 100 is connected to a global internet 135, or general communication network, external to the data center 100. The global internet 135 can provide access to one or more computing systems 145a via private network 140, to one or more other globally accessible data centers 160 that each have multiple computing systems, and to one or more other computing systems 145b. The global internet 135 can be a publicly accessible network of networks, commonly referred to as the Internet, and the private network 140 can be an organization's network that is wholly or partially inaccessible from computing systems external to the private network 140. Computing systems 145b can be home computing systems or mobile computing devices that each connects directly to the global internet 135 (e.g., via a telephone line, cable modem, a Digital Subscriber Line ("DSL"), cellular network or other wireless connection, etc.).

The example data center 100 includes a number of physical computing systems 105a-105d and a Communication Manager module 150 that executes on one or more other computing systems. The example data center further includes a System Manager module 110 that executes on one or more computing systems. In this example, each physical computing system 105a-105d hosts multiple virtual machine computing nodes and includes an associated virtual machine ("VM") communication manager module (e.g., as part of a virtual machine hypervisor monitor for the physical computing system). Such VM communications manager modules and VM computing nodes include VM Communication Manager module 109a and virtual machines 107a on host computing system 105a, and VM Communication Manager module 109d and virtual machines 107d on host computing system 105d.

This illustrative data center 100 further includes multiple physical networking devices, such as switches 115a-115b, edge router devices 125a-125c, and core router devices 130a-130c. Switch 115a is part of a physical sub-network that includes physical computing systems 105a-105c, and is connected to edge router 125a. Switch 115b is part of a distinct physical sub-network that includes the System Manager module 110, and is connected to edge router 125b. The physical sub-networks established by switches 115a-115b, in turn, are connected to each other and other networks (e.g., the global internet 135) via an intermediate communication network 120, which includes the edge routers 125a-125c and the core routers 130a-130c. The edge routers 125a-125c provide gateways between two or more sub-networks or networks. For example, edge router 125a provides a gateway between the physical sub-network established by switch 115a and the interconnection network 120, while edge router 125c provides a gateway between the interconnection network 120 and global internet 135. The core routers 130a-130c manage communications within the interconnection network 120, such as by routing or otherwise forwarding packets or other data transmissions as appropriate based on characteristics of such data transmissions (e.g., header information including source and/or destination addresses, protocol identifiers, etc.) and/or the characteristics of the interconnection network 120 itself (e.g., routes based on the physical network topology, etc.).

The System Manager module 110 and Communication Manager module 109 can configure, authorize, and otherwise manage communications between associated computing nodes, including providing logical networking functionality for one or more virtual computer networks that are provided using the computing nodes. For example, Communication Manager module 109a and 109c manages associated virtual machine computing nodes 107a and 107c and each of the other Communication Manager modules can similarly manage communications for a group of one or more other associated computing nodes. The Communication Manager modules can configure communications between computing nodes so as to overlay a virtual network over one or more intermediate physical networks that are used as a substrate network, such as over the interconnection network 120.

Furthermore, a particular virtual network can optionally be extended beyond the data center 100, such as to one or more other data centers 160 which can be at geographical locations distinct from the first data center 100. Such data centers or other geographical locations of computing nodes can be inter-connected in various manners, including via one or more public networks, via a private connection such as a direct or VPN connection, or the like. In addition, such data centers can each include one or more other Communication Manager modules that manage communications for computing systems at that data. In some embodiments, a central Communication Manager module can coordinate and manage communications among multiple data centers.

Thus, as one illustrative example, one of the virtual machine computing nodes 107a1 on computing system 105a can be part of the same virtual local computer network as one of the virtual machine computing nodes 107d1 on computing system 105d. The virtual machine 107a1 can then direct an outgoing communication to the destination virtual machine computing node 107d1, such as by specifying a virtual network address for that destination virtual machine computing node. The Communication Manager module 109a receives the outgoing communication, and in at least some embodiments determines whether to authorize the sending of the outgoing communication. By filtering unauthorized communications to computing nodes, network isolation and security of entities' virtual computer networks can be enhanced.

The Communication Manager module 109a can determine the actual physical network location corresponding to the destination virtual network address for the communication. For example, the Communication Manager module 109a can determine the actual destination network address by dynamically interacting with the System Manager module 110, or can have previously determined and stored that information. The Communication Manager module 109a then re-headers or otherwise modifies the outgoing communication so that it is directed to Communication Manager module 109d using an actual substrate network address.

When Communication Manager module 109d receives the communication via the interconnection network 120, it obtains the virtual destination network address for the communication (e.g., by extracting the virtual destination network address from the communication), and determines to which virtual machine computing nodes 107d the communication is directed. The Communication Manager module 109d then re-headers or otherwise modifies the incoming communication so that it is directed to the destination virtual machine computing node 107d1 using an appropriate virtual network address for the virtual computer network, such as by using the sending virtual machine computing node 107a1's virtual network address as the source network address and by using the destination virtual machine computing node 107d1's virtual network address as the destination network address. The Communication Manager module 109d then forwards the modified communication to the destination virtual machine computing node 107d1. In at least some embodiments, before forwarding the incoming communication to the destination virtual machine, the Communication Manager module 109d can also perform additional steps related to security.

Further, the Communication Manager modules 109a and/or 109c on the host computing systems 105a and 105c can perform additional actions that correspond to one or more logical specified router devices lying between computing nodes 107a1 and 107c1 in the virtual network topology. For example, the source computing node 107a1 can direct a packet to a logical router local to computing node 107a1 (e.g., by including a virtual hardware address for the logical router in the packet header), with that first logical router being expected to forward the packet to the destination node 107c1 via the specified logical network topology. The source Communication Manager module 109a receives or intercepts the packet for the logical first router device and can emulate functionality of some or all of the logical router devices in the network topology, such as by modifying a TTL ("time to live") hop value for the communication, modifying a virtual destination hardware address, and/or otherwise modify the communication header. Alternatively, some or all the emulation functionality can be performed by the destination Communication Manager module 109c after it receives the packet.

By providing logical networking functionality, the ONM system provides various benefits. For example, because the various Communication Manager modules manage the overlay virtual network and can emulate the functionality of logical networking devices, in certain embodiments specified networking devices do not need to be physically implemented to provide virtual computer networks, allowing greater flexibility in the design of virtual user networks. Additionally, corresponding modifications to the interconnection network 120 or switches 115a-115b are generally not needed to support particular configured network topologies. Nonetheless, a particular network topology for the virtual computer network can be transparently provided to the computing nodes and software programs of a virtual computer network.

Logical/Virtual Networking

FIG. 2 illustrates a more detailed implementation of the ONM system of FIG. 1 supporting logical networking functionality. The ONM system includes more detailed embodiments of the ONM System Manager and ONM Communication Manager of FIG. 1. In FIG. 2, computing node A is sending a communication to computing node H, and the actions of the physically implemented modules 210 and 260 and devices of network 250 in actually sending the communication are shown, as well as emulated actions of the logical router devices 270a and 270b in logically sending the communication.

In this example, computing nodes A 205a and H 255b are part of a single virtual computer network for entity Z. However, computing nodes can be configured to be part of two distinct sub-networks of the virtual computer network and the logical router devices 270a and 270b separate the computing nodes A and H in the virtual network topology. For example, logical router device J 270a can be a local router device to computing node A and logical router device L 270b can be a local router device to computing node H.

In FIG. 2, computing nodes A 205a and H 255b includes hardware addresses associated with those computing nodes for the virtual computer network, such as virtual hardware addresses that are assigned to the computing nodes by the System Manager module 290 and/or the Communication Manager modules R 210 and S 260. In this example, computing node A has been assigned hardware address "00-05-02-0B-27-44," and computing node H has been assigned hardware address "00-00-7D-A2-34-11." In addition, the logical router devices J and L have also each been assigned hardware addresses, which in this example are "00-01-42-09-88-73" and "00-01-42-CD-11-01," respectively, as well as virtual network addresses, which in this example are "10.0.0.1" and "10.1.5.1," respectively. The System Manager module 290 maintains provisioning information 292 that identifies where each computing node is actually located and to which entity and/or virtual computer network the computing node belongs.

In this illustrative example, computing node A 205a first sends an address resolution protocol (ARP) message request 222-a for virtual hardware address information, where the message is expected to first pass through a logical device J before being forwarded to computing node H. Accordingly, the ARP message request 222-a includes the virtual network address for logical router J (e.g., "10.0.0.1") and requests the corresponding hardware address for logical router J.

Illustratively, the Communication Manager module R intercepts the ARP request 222-a, and obtains a hardware address to provide to computing node A as part of spoofed ARP response message 222-b. The Communication Manager module R can determine the hardware address by, for example, looking up various hardware address information in stored mapping information 212, which can cache information about previously received communications. Communication Manager module R can communicate 227 with the System Manager module 290 to translate the virtual network address for logical router J.

The System Manager module 290 can maintain information 294 related to the topology and/or components of virtual computer networks and provide that information to Communication Manager modules. The Communication Manager module R can then store the received information as part of mapping information 212 for future use. Communication Manager module R then provides computing node A with the hardware address corresponding to logical router J as part of response message 222-b. While request 222-a and response message 222-b actually physically pass between computing node A and Communication Manager module R, from the standpoint of computing node A, its interactions occur with local router device J.

After receiving the response message 222-b, computing node A 205a creates and initiates the sending of a communication 222-c to computing node H 255b. From the standpoint of computing node A, the sent communication will be handled as if logical router J 270a were physically implemented. For example, logical router J could modify the header of the communication 265a and forward the modified communication 265b to logical router L 270a, which would similarly modify the header of the communication 265b and forward the modified communication 265c to computing node H. However, communication 222-c is actually intercepted and handled by Communication Manager module R, which modifies the communication as appropriate, and forwards the modified communication over the interconnection network 250 to computing node H by communication 232-3. Communication Manager module R and/or Communication Manager module S may take further actions in this example to modify the communication from computing node A to computing node H or vice versa to provide logical networking functionality. For example, Communication Manager module S can provides computing node H with the hardware address corresponding to logical router L as part of response message 247-e by looking up the hardware address in stored mapping information 262. In one embodiment, a communication manager or computing node encapsulates a packet with another header or label where the additional header specifies the route of the packet. Recipients of the packet can then read the additional header and direct the packet accordingly. A communication manager at the end of the route can remove the additional header.

A user or operator can specify various configuration information for a virtual computer network, such as various network topology information and routing costs associated with the virtual 270a, 270b and/or substrate network 250. In turn, the ONM System Manager 290 can select various computing nodes for the virtual computer network. In some embodiments, the selection of a computing node can be based at least in part on a geographical and/or network location of the computing node, such as an absolute location or a relative location to a resource (e.g., other computing nodes of the same virtual network, storage resources to be used by the computing node, etc.). In addition, factors used when selecting a computing node can include: constraints related to capabilities of a computing node, such as resource-related criteria (e.g., an amount of memory, an amount of processor usage, an amount of network bandwidth, and/or an amount of disk space), and/or specialized capabilities available only on a subset of available computing nodes; constraints related to costs, such as based on fees or operating costs associated with use of particular computing nodes; or the like.

Route Selection on Substrate Network

Figure 3:
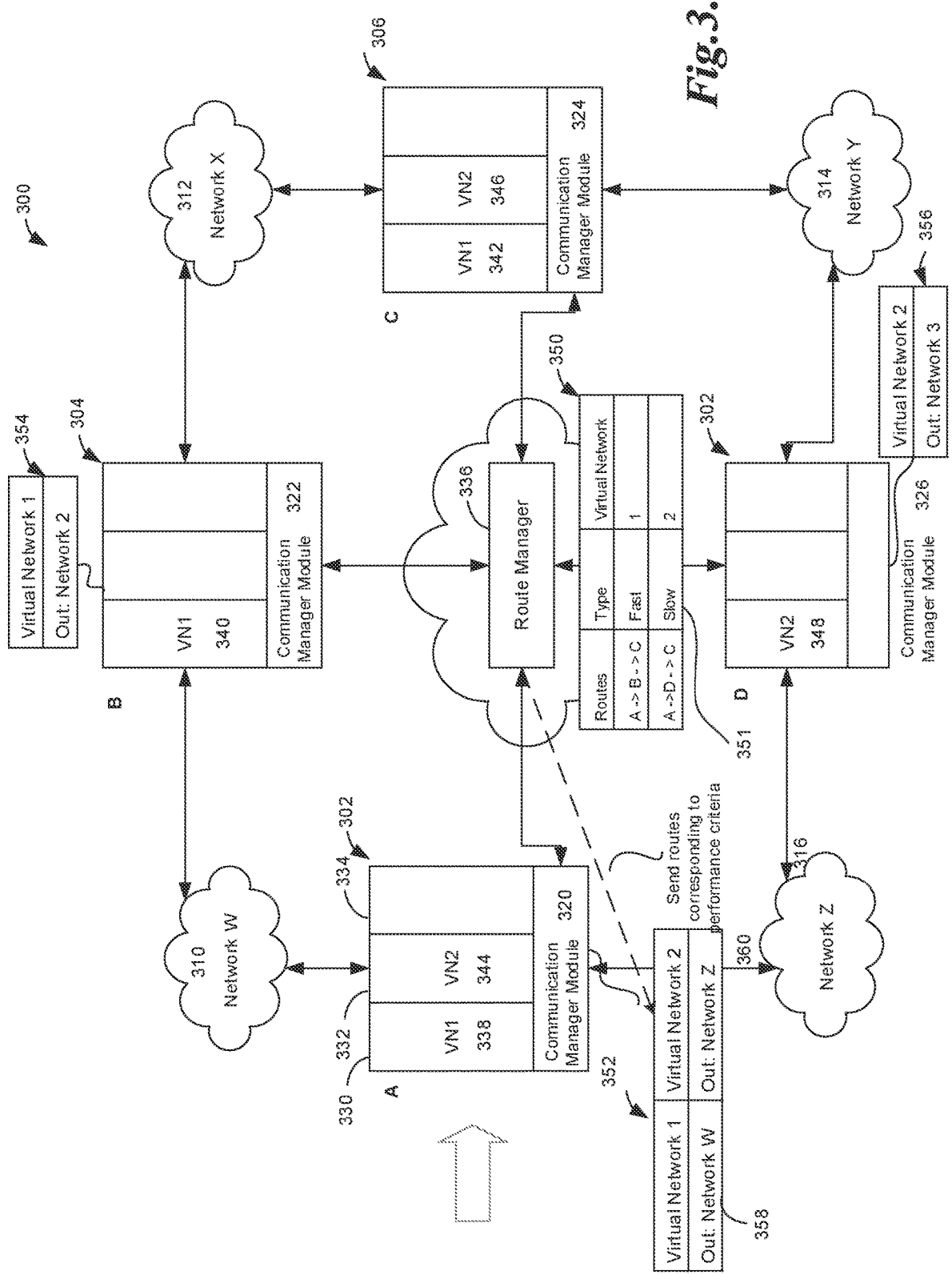
FIG. 3 is a block diagram of the substrate network of FIG. 1 illustrating a substrate network configuration associated with overlay networks.

FIG. 3 illustrates an example embodiment of a substrate network 300 having a route manager 336 capable of determining routes for overlay networks. The substrate network 300 can be composed of one or more substrate components or nodes, such as computing nodes, routing nodes, communication links or the like. In FIG. 3, the substrate network 300 includes computing nodes A 302, B 304, C 306, and D 308, which are capable of simulating various components of one or more associated overlay networks. The nodes can be located on the same data center or in multiple data centers. Computing node A is interconnected to node B via network W 310, node B is connected to node C by network X 312, node C is connected to node D by network Y 314, and node D is connected to node A by network Z 316. Networks W, X, Y, and Z can include one or more physical networking devices, such as routers, switches, or the like, and can include private or public connections. Components shown in FIG. 3, such as the computing nodes and communication manager modules, can implement certain of the features of embodiments described above with respect to FIGS. 1 and 2.

In FIG. 3, nodes A 302, B 304, C 306, and D 308 are associated with a respective Communication Manager module 320, 322, 324, and 326. The communication manager modules can implement certain of the features described in the Communication Manager 150, 210, 260 and VM Communication manager 109a, 109b, 109c, 109d of FIGS. 1 and 2. For example, the Communication Manager module 320 for node A can operate on a hypervisor monitor of the computing node and can direct the communication of one or more virtual computing nodes 330, 332, 334 of node A. The computing nodes, communication managers and Route Manager 336 can be part of the same ONM system. In one embodiment, the computing nodes run the XEN operating system (OS) or similar virtualization OS, with the communication managers operating on domain 0 or the first OS instance and the virtual computing nodes being domain U or additional OS instances.

The communication manager modules in FIG. 3 are in communication with a Route Manager module 336, operating on one or more computing devices, that directs routing for the substrate network 300. In one embodiment, the Route Manager operates as part of the ONM System Manager module 110, 290 of FIGS. 1 and 2, with functionally combined into a single module. The Route Manager can be located within a data center or at a regional level and direct traffic between data centers. In one embodiment, multiple Route Managers can operate in a distributed manner to coordinate routing across multiple data centers.

In FIG. 3, two virtual networks are associated with the substrate network 300. Virtual network 1 (VN1) has components 338, 340, 342, associated with virtual computing nodes on computing nodes A 302, B 304, and C 306. Virtual network 2 (VN2) has components 344, 346, 348 associated with virtual computing nodes on nodes A, C, and D 308.

As the Routing Manager module 336 directs network traffic on the substrate network 300, traffic can be directed flexibly and various network configurations and network costs can be considered. For example, routing paths can be determined based on specified performance levels for the virtual networks. In one embodiment, if the user for VN1 is entitled to a higher service level, such as for faster speed (e.g. lower latency and/or higher bandwidth), traffic associated with VN1 can be routed on a "fast" path of the substrate network 300. For example, in one embodiment, traffic for "platinum" users is prioritized over traffic for "gold" and "silver" users, with traffic from "gold" users prioritized over "silver" users. In one embodiment, at least some packets of the user with the higher service level are prioritized over packets of a user with a lower service level, for example, during times of network congestion. The user may be entitled to a higher level because the user has purchased the higher service level or earned the higher service level through good behavior, such as by paying bills, complying with the operator's policies and rules, not overusing the network, combinations of the same, or the like.

The Route Manager 336 can store user information or communicate with a data store containing user information in order to determine the target performance level for a virtual network. The data store can be implemented using databases, flat files, or any other type of computer storage architecture and can include user network configuration, payment data, user history, service levels, and/or the like. Typically, the Route Manager will have access to node and/or link characteristics for the substrate nodes and substrate links collected using various network monitoring technologies or routing protocols. The Route Manager can then select routes that correspond to a selected performance level for the virtual network and send these routes to the computing nodes. For example, network W 310 and Y 312 can be built on fiber optic lines while network Y 314 and Z 316 are built on regular copper wire. The Route Manager can receive network metrics data and determine that the optical lines are faster than the copper wires (or an administrator can designate the optical lines as a faster path). Thus, the Route Manager, in generating a route between node A 302 and node C 306 for "fast" VN1 traffic, would select a path going through network W and Y (e.g., path A-B-C).

In another situation, where the user for VN2 is not entitled to a higher service level, VN2 traffic from node A 302 to node B 306 can be assigned to a "slow" or default path through network Y 314 and Z 316 (e.g. path A-D-C). In order to track routing assignments, the Routing Manager can maintain the routes and/or route association in a data store, such as a Routing Information Base (RIB) or routing table 350. The Route Manager can also track the target performance criteria 351 associated with a particular virtual network.

In order to direct network traffic on the substrate network 300, the Routing Manager 336 can create forwarding entries for one or more of the Communication Manager modules 320, 322, 324, 326 that direct how network traffic is routed by the Communication Manager. The Communication Manager modules can store those entries in forwarding tables 352, 354, 356, or other similar data structure, associated with a Communication Manager. For example, for VN1, the Route Manager can generate a control signal or message, such as a forwarding entry 358, that directs VN1 traffic received or generated on node A 302 through network W 310 (on path A-B-C). Meanwhile, for VN2, the Route Manager can generate a control signal or message, such as a forwarding entry 360, which directs traffic received on node A through network Z. The Route Manager can send these forwarding entries to the node A Communication Manager 320, which can store them on its forwarding table 352. Thus, network traffic associated with VN1 and VN2, destined for node C 306 received or generated on node A can travel by either path A-B-C or path A-D-C based on the designated performance level for VN1 and VN2.

While the example of FIG. 3 depicts only two virtual networks, the Route Manager 336 can similarly generate and maintain routes for any number of virtual networks. Likewise, the substrate network 300 can include any number of computing nodes and/or physical network devices. Routes can be determined based on multiple performance criteria, such as network bandwidth, network security, network latency, and network reliability. For example, traffic for a virtual network suspected of being used for spamming (e.g. mass advertisement emailing) can be routed through network filters and scanners in order to reduce spam.

Figure 4A:
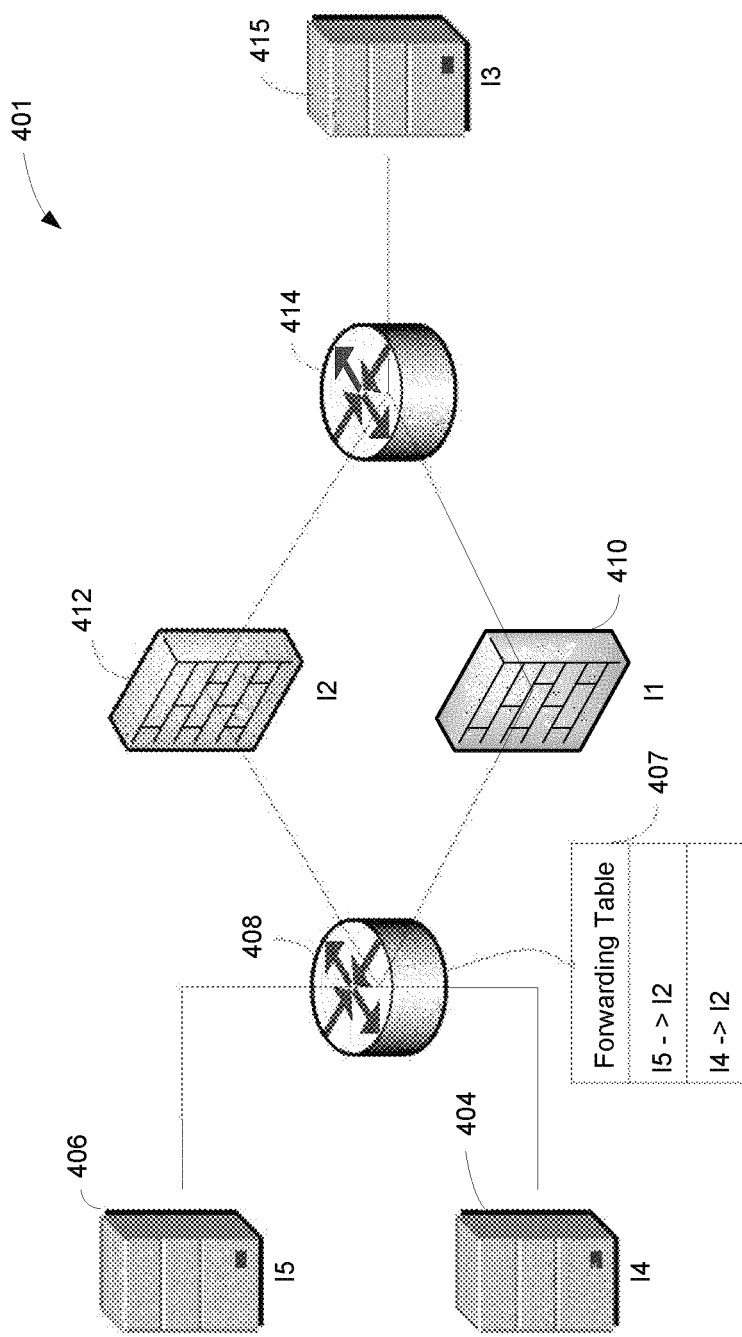
FIGS. 4A and 4B are block diagrams of the substrate network of FIG. 1 illustrating independently determined substrate routing.
Figure 4B:
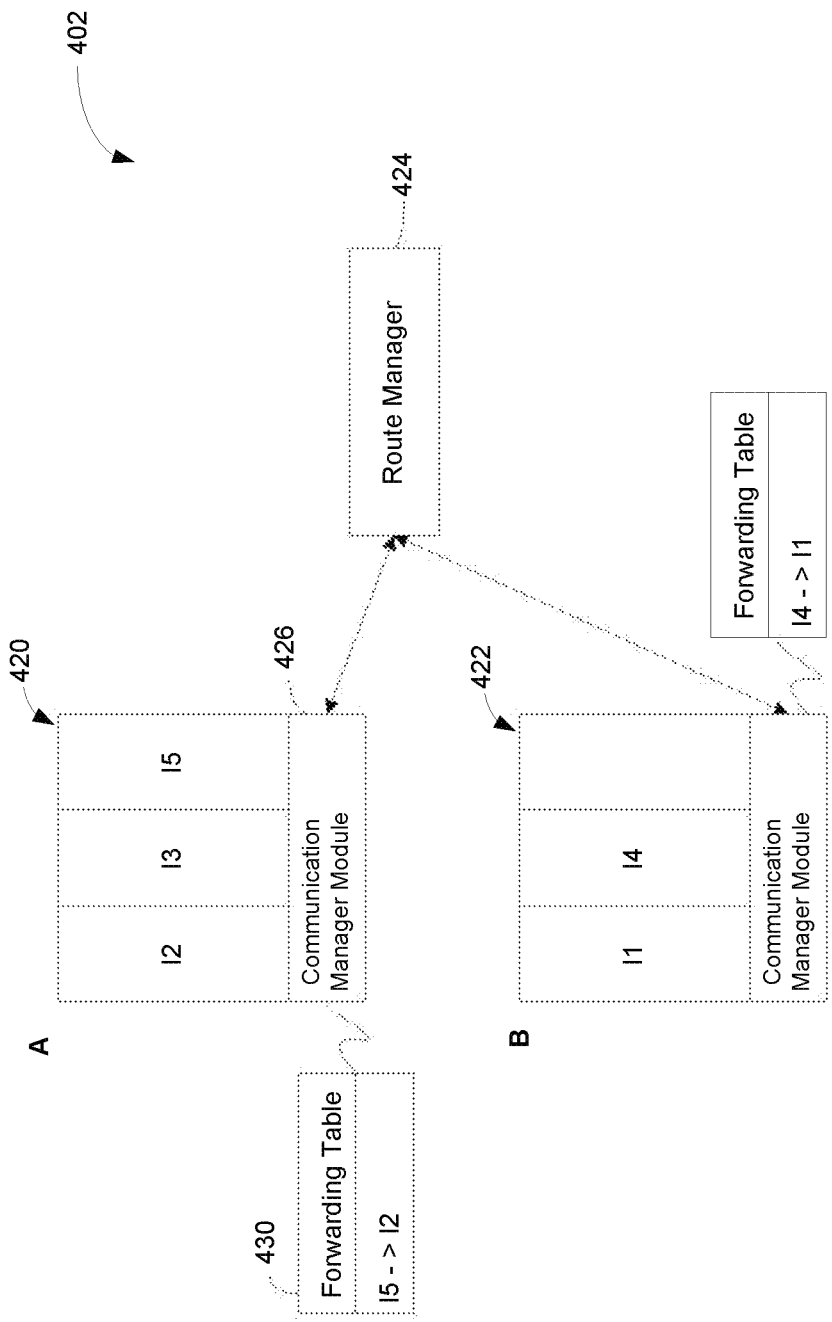

FIGS. 4A and 4B illustrate a virtual network 401 and corresponding substrate network 402 where substrate routing is independently determined from virtual routing. FIG. 4A illustrates a virtual network including several virtual network components. Virtual computing nodes I4 404 and I5 406 are connected to a logical router 408. The logical router can implement certain of the features described in the logical router 270a, 270b of FIG. 2. The logical router is connected to firewalls I1 410 and I2 412. The logical router is configured to direct traffic from I5 to I2 and I4 to I2, as would be the case if I2 were a backup firewall. The forwarding table associated with logical router 409 reflects this traffic configuration. I1 and I2 are connected to a second router 414. The second router is connected to another virtual computing node, I3 415. Thus, based on the topology and associated forwarding table of the virtual network 401, traffic from I4 and I5 to I3 passed through I2.

FIG. 4B illustrates an example topology of the substrate network 402 associated with the virtual network 401. The substrate network includes computing node A 420, computing node B, and a Route Manager 424. Substrate nodes A and B are each associated with a Communication Manager 426, 428. Node A is simulating the operation of virtual components I2, I3, and I5 while Node B is simulating the operation of virtual components on I1 and I4 on their respective virtual machines. The Route Manager can then use information regarding the assignments of virtual components to computing nodes to optimize or otherwise adjust routing tables for the substrate network. The Route Manager can receive such information from the Communication Managers and/or the System Manager. For example, assuming I1 and I2 are identical virtual firewalls, the Route Manager can determine that because I5 and I2 are located on the same computing node, while I4 and I1 are located on the other node, virtual network traffic can be routed from I5 to I2 and from I4 to I1 without leaving the respective computing node, thus reducing traffic on the network. Such a configuration is reflected in the illustrated forwarding tables 430, 432 associated with the Communication Managers. Thus, routes on the substrate network can be determined independently of virtual network routes.

In some embodiments, the Route Manager 424 or System Manager can optimize or otherwise improve network traffic using other techniques. For example, with reference to FIGS. 4A and 4B, another instance of I3 can be operated on node B 422, in addition to the instance of I3 on node A. Thus, virtual network traffic from I5-I2-I3 and I4-I1-I3 can remain on the same computing node without having to send traffic between computing nodes A and B. In one embodiment, substrate traffic can be optimized or otherwise improved without having different forwarding entries on the substrate and the virtual network. For example, with reference to FIG. 4B, I4 can be moved from computing node B 422 to node A 420, thus allowing virtual traffic from I5 and I4 to I2 to remain on the same computing node. In this way, a user monitoring traffic on logical router 408 would see that traffic is flowing according the forwarding table in the router, that is, substrate routing is transparent to the user. Other techniques for optimizing traffic by changing the association of virtual components with virtual machines and/or duplicating components can also be used.

In some situations, it can be desired that substrate routes reflect routes specified in the virtual table. For example, the virtual network user can wish to control how traffic is routed in the substrate network. However, rather than giving the user access to the substrate network, which could put other users at risk or otherwise compromise security, a data center operator can propagate network configuration or virtual network characteristics specified by the user for the virtual network to the substrate network. This propagated data can be used in generating routing paths in the substrate network, thus allowing the user to affect substrate routing without exposing the substrate layer to the user.

Route Selection on Overlay/Virtual Network

Figure 5A:
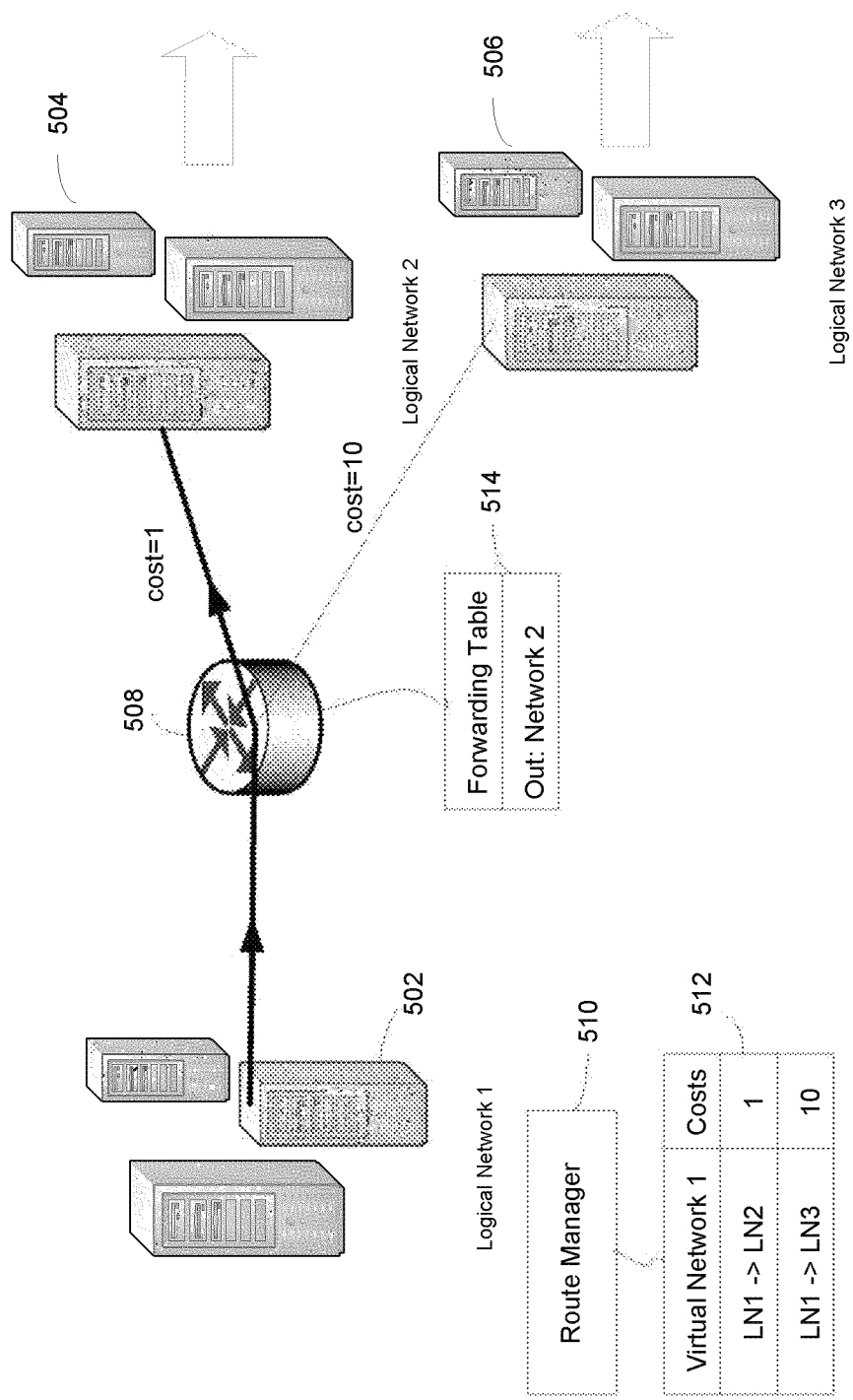
FIGS. 5A and 5B are block diagrams of the substrate network of FIG. 1 illustrating virtual route selection propagation to the substrate network.
Figure 5B:
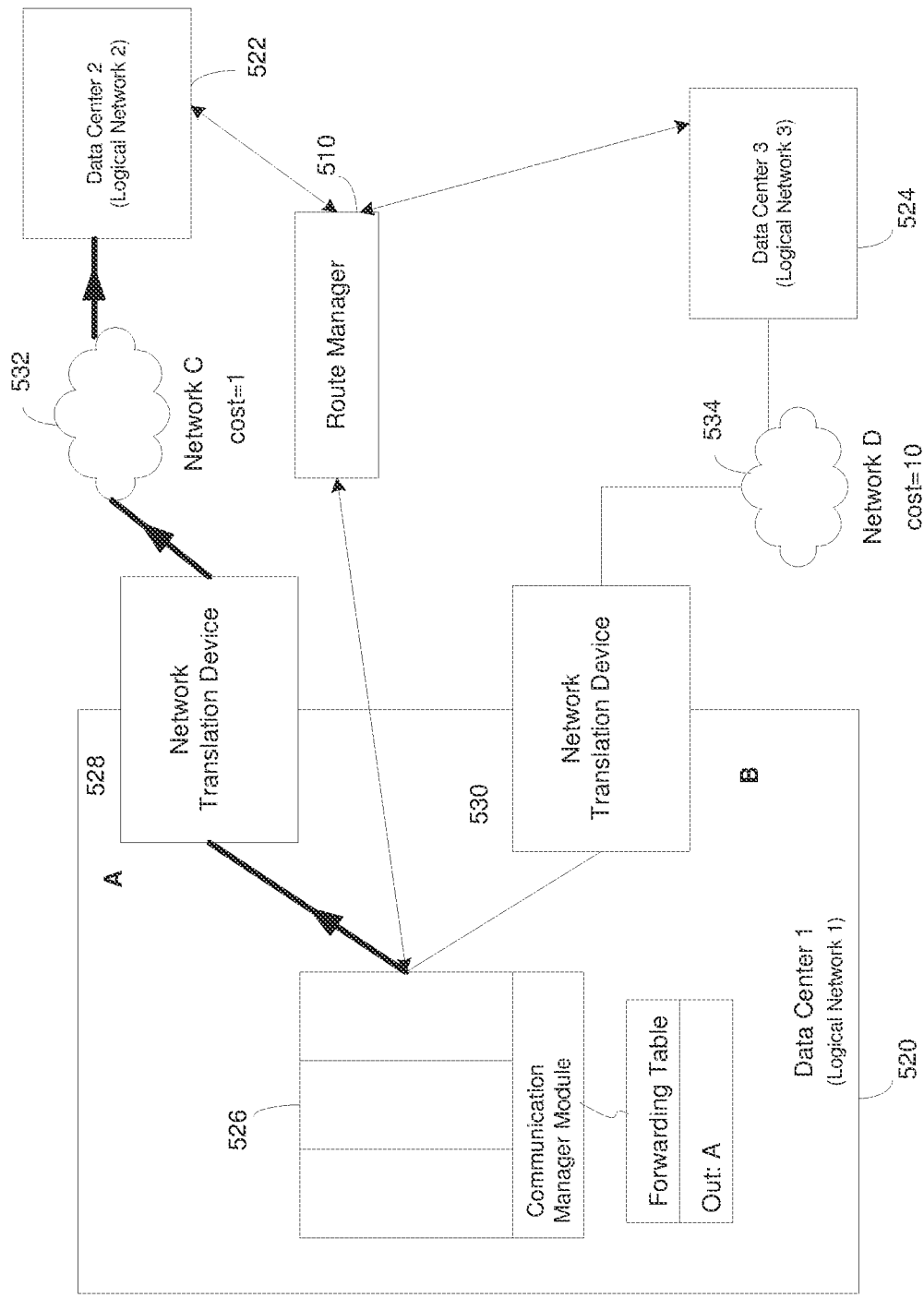

FIGS. 5A and 5B illustrate a virtual route selection propagated to the substrate network. FIG. 5A illustrates a virtual network topology where logical network 1 (LN1) 502 is connected to logical network 2 (LN2) 504 and logical network 3 (LN3) 506 by a logical router 508. The current preferred routing path specified by the user is from LN1 to LN2.

A user may wish to specify a route for various reasons. For example, routing costs through LN2 can be cheaper than LN3, such as when LN2 and LN3 are in different locations with different ISPs and one ISP charges lower rates than another. In another example, LN3 can be a backup virtual network for LN2, and used only in some situations, such as for handling overflow from LN2.

Referring back to FIG. 5A, the user can specify preferred routes through the virtual network and/or characteristics or costs associated with the virtual components, such as monetary costs, packet loss rates, reliability rate, and/or other metrics. These characteristics can be assigned to the virtual components, such as the virtual computing nodes, node links, logical routers/switches, or the like. The Route Manager 510 can then determine routing tables 512 and/or forwarding tables 514 for the virtual network.

FIG. 5B illustrates an example of a substrate route that can correspond to the virtual route in FIG. 5A. In the figure, there are three data centers 520, 522, 524 corresponding to the logical networks 502, 504, 506 of FIG. 5A. In data center 1 (DC1), a computing node 526 is connected to a network translation device A (NTD A) 528 and a network translation device B (NTD B) 530. The network translation devices are connected to external networks C 532 and D 534, respectively.

The network translation devices can serve as a gateway or entry/exit point into the virtual network. In some embodiments, the network translation devices can translate between a first addressing protocol and a second addressing protocol. For example, if the virtual network is using IPv6 and the external networks are using IPv4, the network translation devices can translate from one addressing protocol to the other for traffic in either direction. In one embodiment, users connect from their private networks to the data centers via a VPN or other connection to a network translation device, which translates and/or filters the traffic between networks.

Referring back to FIG. 5B, network C 532 connects data center 2 522 to NTD A 528. Network D 534 connects data center 3 524 to NTD B 530. The Route Manager module 510 is in communication with data center 1 520, data center 2 522, and data center 3 524, particularly with the Communication Manager for the computing node 526.

From information associated with the virtual network, the Route Manager 510 can determine that the user wants to route traffic from LN1 to LN2. The Route Manager can then "favor" substrate routes associated with the LN1 to LN2 virtual path. For example, the Route Manager can specify a low routing cost (e.g. cost 1) for communications, such as data packets, travelling on Network C relative to Network D (e.g. cost 10) such that during route determination, routes through Network C are favored. In one embodiment, the Route Manager can apply a coefficient to stored substrate costs in order to favor one route over another. In another example, explicit routing paths can be set up corresponding to the virtual route. The Route Manager can identify routes in its routing table and communicate those routes with one or more Communication Managers.

Referring back to FIG. 5B, when the computing node 526 receives or generates a packet destined for LN2 or a network reachable from LN2, the computing node can be configured by the Route Manager to send packets through NTD A 528 as it lies on the route including network C 532.

By propagating virtual network configuration data to the substrate, and using that configuration data in substrate route calculation, a mechanism is provided for a virtual network user to affect substrate routing. In some embodiments, the virtual configuration data can be used in determining association of the virtual components with the substrate components. For example, components of the same virtual network can be associated with the same substrate computing node or on computing nodes connected to the same switch in order to minimize or otherwise improve substrate network traffic. Configuration data can also be provided the other way and, in some embodiments, the user and/or virtual network can be provided with additional substrate information, such as characteristics of the underlying associated substrate components (e.g., performance, costs) in order to make more informed routing decisions.

Figure 6:
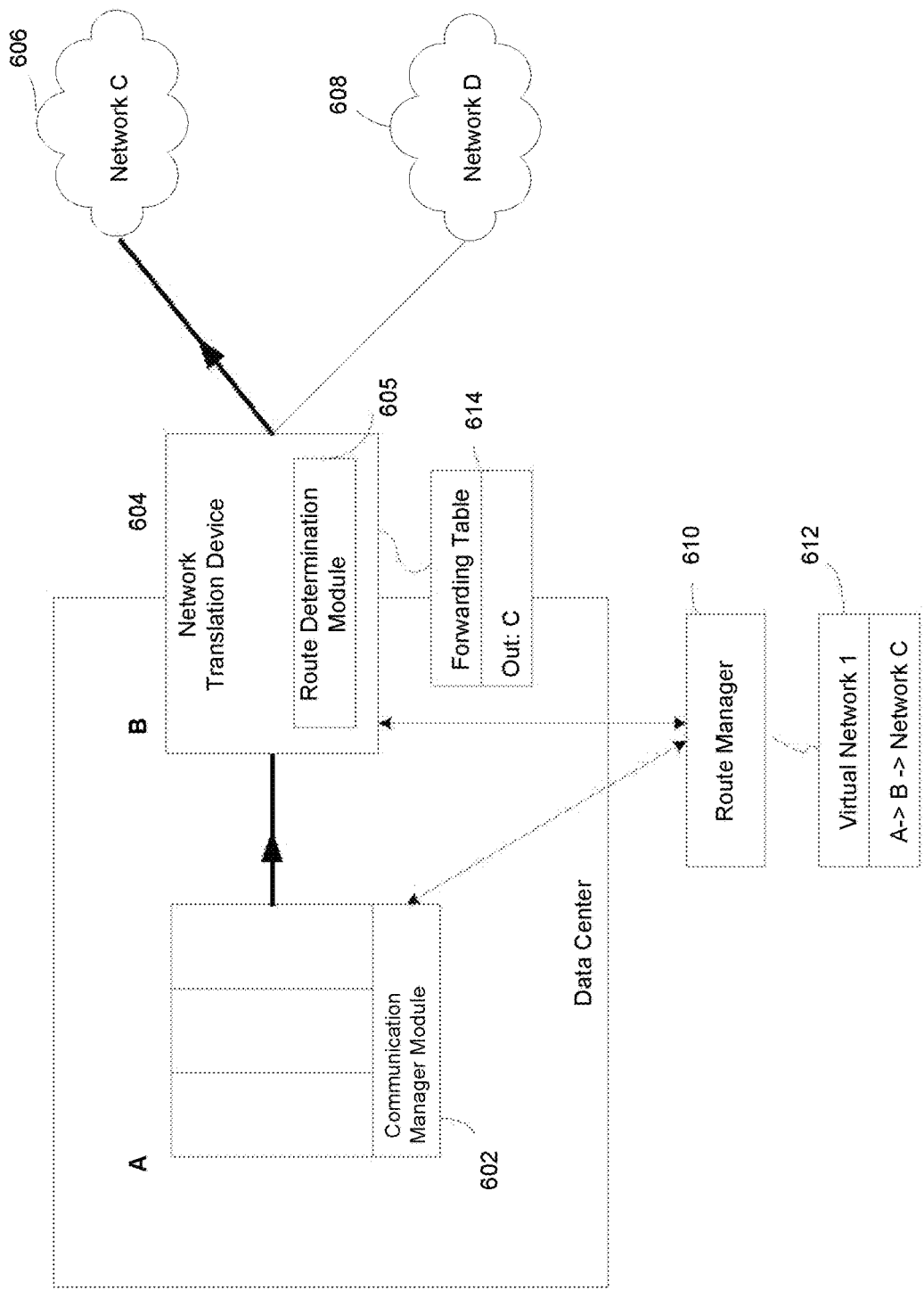
FIG. 6 is a block diagram of the substrate network of FIG. 1 illustrating the determination of routes into or out of a virtual network by network translation device.

FIG. 6 illustrates an example substrate network wherein a network translation device determines routes into or out of a virtual network. In FIG. 6, a communication, such as a data packet, leaves computing node A, which is associated with a virtual network, through NTD B 604. The network translation device can include a Route Determination module 605 for determining the packet route. NTD B is connected to network C 606 and network D 608.

In FIG. 6, the Route Manager 610 receives a network configuration or determines that route A-B-C is preferred or has a cheaper cost. The Route Manager can store the route in a routing table 612. The Route Manager can then send forwarding entries to the NTD B 604 that configure it to send traffic through network C 606. NTD B can contain multiple forwarding entries for multiple virtual networks, such that data for one virtual network can be sent through network C, while another virtual network sends data through network D. In some cases, network packets with the same source and/or destination are sent by different networks based on the associated virtual network.

In some embodiments, the substrate component may not have a Communication Manager or a Route Determination module and other ways of coordinating routing can be used. For example, a substrate component, such as an ordinary router or a network translation device, can be set up multiply on separate paths. Using blacklists, network traffic for a particular virtual network can be allowed on one path but blocked on others. The Route Manager can send a control signal or message updating the blacklists to manage the data flow.

In other embodiments, substrate components can implement IP aliasing, where, for example, "fast" path packets use one set of IP addresses, while "slow" path packets use another set of IP addresses. When the substrate component receives the packet, it can determine which path to use based on the IP address. The Route Manager can send a control signal or message to assign IP addresses to the components based on the type of traffic handled.

Other ways of differentiating how packets are handled by substrate components include: tagging of packets, such as by Multiprotocol Label Switching (MPLS); MAC stacking where a packet could have multiple MAC addresses, the first MAC address for a substrate component, such as a switch, and a second MAC address for a next component either on the "fast" or the "slow" path; and using Network Address Translation (NAT) devices on both ends of a network in order to redirect traffic into the network, such as by spoofing or altering an destination address for an incoming packing and/or altering an the source address of an outgoing packet. In some embodiments, the Route Manager generates control signals or messages for coordinating traffic on the substrate network for the various techniques described above.

Virtual Network Route Selection Process

FIG. 7A illustrates a flow diagram for a process 700 of propagating virtual routes to a substrate network usable in the example networks described above. The virtual routes can be based on network configuration data provided by a virtual network user, such as costs, component characteristics, preferred routes, and/or the like.

At block 705, the Route Manager module receives user configuration and/or network configuration data, such as, for example, policy based routing decisions made by the user. In some embodiments, a user interface is provided, allowing a user to specify configuration data. The Route Manager can receive the configuration data from a data store, for example, if user configuration and/or network configuration data are stored on the data store after being received on the user interface or otherwise generated. In some embodiments, the configuration data can include explicit routing paths through the virtual network. In some embodiments, the configuration data can specify associated costs for traversing components of the virtual network, such as links and/or nodes. These costs can be based on monetary costs, packet loss rates, reliability rate, and/or other metrics. These costs can be provided by the user to configure the virtual network provided by the data center operator. However, costs and other network configuration data can come from the data center operator themselves in addition to or instead of from the user. For example, the data center operator can use the virtual network to provide feedback to the user on routing costs, such as by associating monetary use costs for the substrate computing nodes and/or components. In one example, the data center operator can specify a high cost for a high speed network link or high powered computing node so that the virtual network user can take into account that cost in configuring the virtual network.

At block 710, the Route Manager module determines virtual network routes based on the user configuration and/or network configuration data. In some embodiments, routing protocols or the route determination algorithms of the routing protocols, such as BGP, OSPF, RIP, EIGRP, or the like, can be used to determine virtual routes.

At block 715, the Route Manager determines one or more forwarding entries for substrate network components, such as computing nodes, network translation devices, or the like. As the Route Manager can determine routing paths and propagate routing decisions to the substrate components, the Route Manager can coordinate routing within a data center and/or between multiple data centers.

At block 720, the Route Manager transmits the forwarding entries to the substrate components. At block 725, the substrate component receives the forwarding entries. The substrate network components can store the forwarding entries in FIB tables or similar structures. Generally, a Communication Manager on the substrate component receives and processes the forwarding entry and manages communications of the substrate component. However, as discussed above, network traffic can also be coordinated for substrate components without a Communication Manager using instead, for example, a NAT device, or the like. In some embodiments, the Route Manager can send blacklist updates, manage tagging of the packets, generate stacked MAC addresses, or the like.

At block 730, the substrate components route packets received or generated according to the stored forwarding entries. Generally, a Communication Manager on the substrate component manages the packet routing and refers to the forwarding entries to make forwarding decisions.

Substrate Network Route Selection Process

Figure 7B:
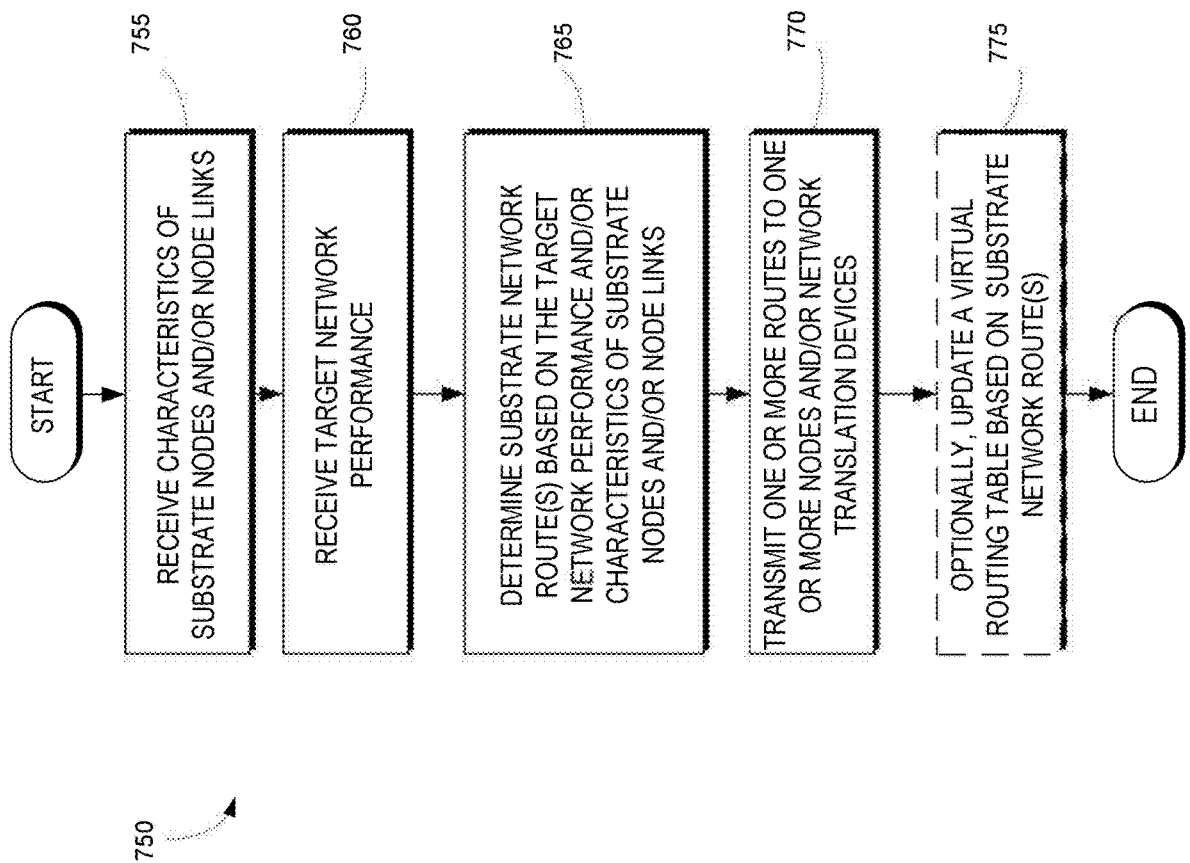
FIG. 7B illustrates a flow-diagram for a process of determining substrate routing based on target performance characteristics of the associated virtual network.

FIG. 7B illustrates a flow-diagram for a process 750 for determining substrate routing based on target performance characteristics of the associated virtual network usable in the example networks described above. In some instances, the Route Manager can optionally generate a virtual routing table for the virtual network before determining substrate routing. The virtual routing table can be used to determine virtual routing paths, allowing optimization of network traffic by selective association of the virtual network components with substrate computing nodes, such as by taking into account physical location and virtual network traffic patterns. However, generation of the virtual routing table is not necessary as the substrate routes can be determined independently of the virtual routes, as will be described below. In addition, user configuration and/or network configuration data provided by the user can be used to describe the virtual network, without needing to generate a virtual routing table.

At block 755, the Route Manager receives characteristics of the substrate nodes and/or node links. The Route Manager can receive the characteristics data from a data store. In some embodiments, a user interface is provided, allowing a user to specify characteristics data. The characteristics can describe such things as monetary costs, network bandwidth, network security, network latency, network reliability, and/or the like. These characteristics can be used in a cost function for determining substrate routing paths. This information can be kept by the Route Manager or data source accessible by the Route Manager.

At block 760, the Route Manager receives a target network performance for the virtual network. The target performance can be based on a purchased service level by the user, user history, security data, or the like. For example, a service level purchased by a user can have minimum bandwidth, latency, or quality of service requirements. In another example, a user can be a new customer with an unknown payment history such that the user is provisioned on a "slow" virtual network in order to minimize incurred expenses in case the user fails to pay. In another example, a user identified as carrying dangerous or prohibited traffic, such as viruses, spam, or the like, can be quarantined to particular substrate components. During quarantine, the virtual network components can be assigned to specialized substrate components with more robust security features. For example, the substrate components can have additional monitoring functionally, such as a deep-packet scanning ability, or have limited connectivity from the rest of the substrate network.

At block 765, the Route Manager determines substrate network routes based on the target network performance and/or characteristics of the substrate nodes and/or links. In one embodiment, the Route Manager can use the characteristic data in a cost function for determining routes. Which characteristic to use or what level of service to provide can be determined by the performance criteria or target performance. For example, for a "fast" route, the Route Manager can use bandwidth and/or latency data for the substrate network to generate routes that minimize latency, maximize available bandwidth, and/or otherwise improve network performance.

The Route Manager can re-determine routes as needed based on changes in the network, the configuration data, and/or the performance level. For example, if a user has purchased N gigabits of "fast" routing but has reached the limit, the Route Manager can generate new routes and shift the user to "slow" routing.

At block 770, the Route Manager transmits forwarding entries for one or more routes to one or more nodes and/or network translation devices. In some embodiments, the Route Manager determines forwarding entries for the substrate components and sends those forwarding entries to the substrate components on the path. In some embodiments, the Route Manager can send blacklist updates, manage tagging of data packets, and/or generate stacked MAC addresses.

At block 775, the Route Manager can optionally update the virtual routing table based on substrate network routes. By changing the virtual network routing table based on the substrate routes, the virtual network can stay logically consistent with the behavior of the substrate network. Thus, users won't necessarily be confused by discrepancies in the virtual routing.

Security Assessment Management within a Virtual Machine Network

Figure 8:
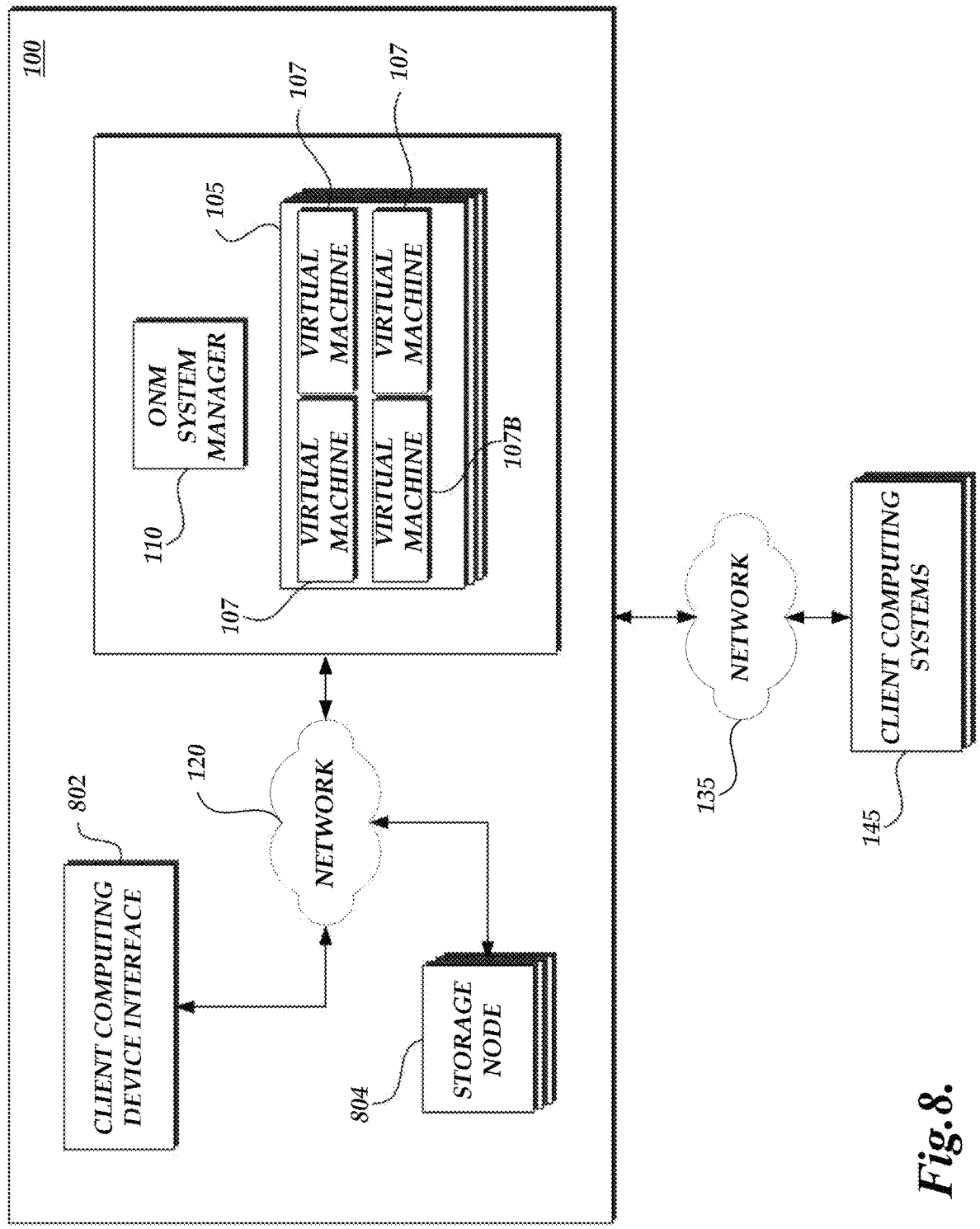
FIG. 8 is a simplified block diagram of the substrate network of FIG. 1 illustrating hosted virtual machine networks.
Figure 9:
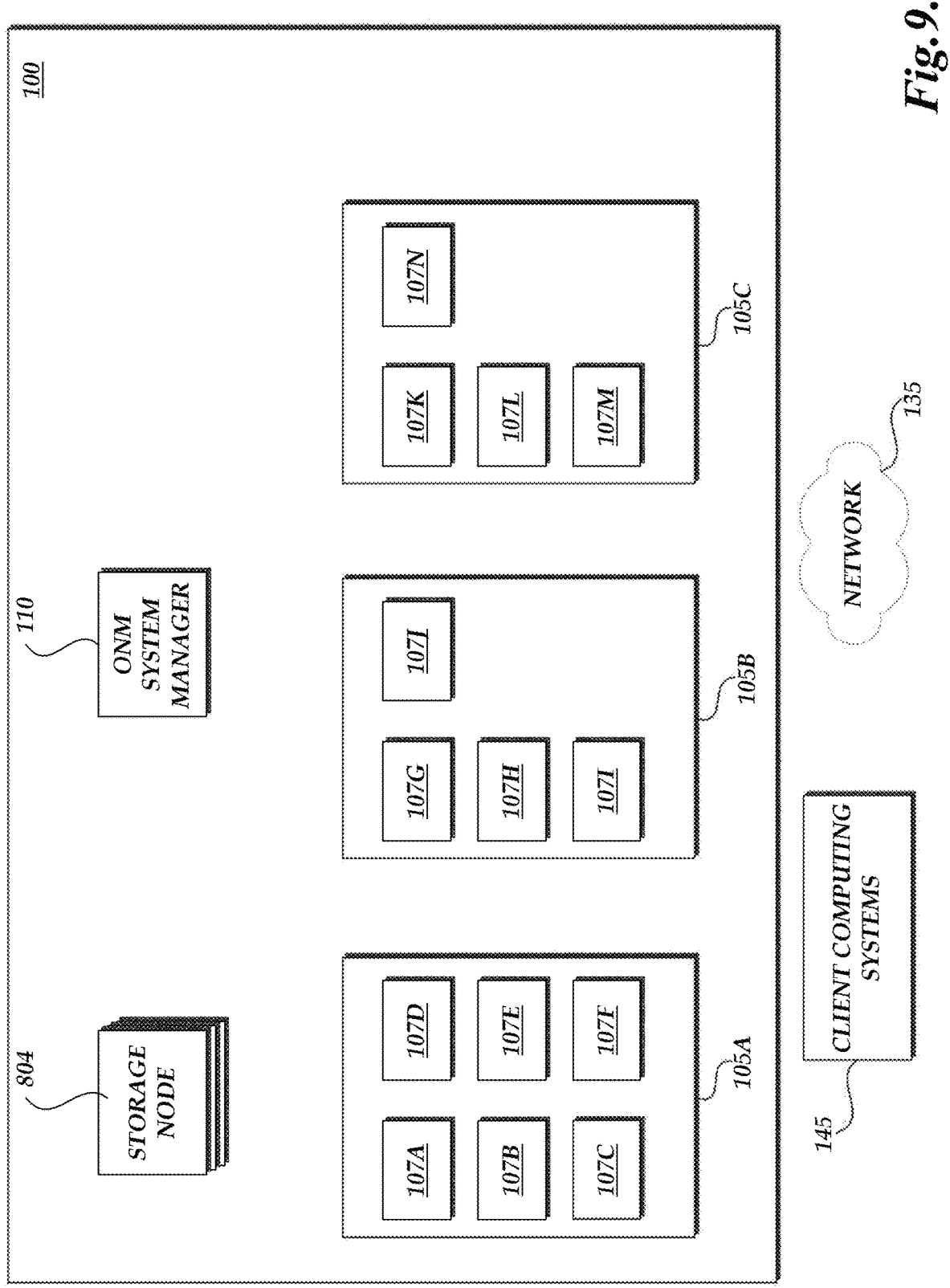
FIG. 9 is a simplified block diagram of the substrate network of FIG. 1 illustrating hosted virtual machine networks.

With reference now to FIGS. 8-14, various embodiments for the monitoring and management of virtual machine security assessments within hosted virtual machine networks will be described. With reference to FIGS. 8 and 9, a simplified block diagram of the substrate network 100 of FIG. 1 will be described for purposes of illustrating the interaction between various components of the substrate network. However, one skilled in the relevant art will appreciate that illustrative interaction and communications may include, or otherwise involve, additional components not illustrated in the illustrative drawing figures.

With reference to FIG. 8, the substrate network 100 includes a number of physical computing systems 105 that host one or more virtual machine instances 107. One skilled in the relevant art will appreciate that the number of virtual machine instances hosted on each physical computing system 105 can vary according to the computing device resources associated with each individual physical computing system 105 and in accordance with the management policies of the substrate network 100. The substrate network 100 also includes a virtual machine manager component, such as ONM system manager 110, for managing the allocation of virtual machine instances 107 on the various physical computing systems 105. Although the virtual machine manager component is illustrated with regard to functionality implemented by a component of the substrate network 100, in an alternative embodiment, the virtual machine manager component may be implemented as a stand alone component of the substrate network, integrated into a single physical computing system 105 or distributed as functionality implemented among multiple physical computing devices 105.

In communication with the ONM system manager 110 via the communication network 120 is a client computing device interface 802 for obtaining requests from various client computing systems 145 via the external communication network 135. The client computing device interface 802 can obtain various requests, such as requests for modifying or configuring sets of virtual machine instances 107, requests for virtual machine network assessment configurations as well as other requests. Illustratively, the client computing device interface 802 can facilitate interaction with client computing systems 145 via established Application Protocol Interfaces ("APIs") provide by the substrate network 100.

Also in communication with the ONM system manager 110 is one or more storage nodes 804 for archiving or storing information associated with security assessments or other execution of virtual machine instances 107. The storage nodes 804 can correspond to various storage media including physical storage media associated specifically with the substrate network 100. Additionally, or alternatively, the storage nodes 804 can correspond to various network based storage networks accessible to the substrate network 100 via communication network 120.

With reference now to FIG. 9, in one embodiment, the substrate network 100, such as the simplified substrate network illustrated in FIG. 8, includes three physical computing systems 105A, 105B, 105C. Each physical computing system 105A-105C hosts a number of virtual machine instances 107. Specifically, for purposes of illustration, at some point in time, physical computing system 105A hosts virtual machine instances 107A-107F. At the same point in time, physical computing system 105B hosts virtual machine instances 107G-107J. Likewise, physical computing system 105*c* hosts virtual machine instances 107K-107N.

In accordance with aspects of the present disclosure, the virtual machine instances 107A-107N can be associated into various sets of virtual machine instances. For example, the sets of virtual machine instances can be associated by affiliation to specific users or user accounts, affiliation to organizations (e.g., a corporate network), specific software applications executed by the virtual machine instances, specific operating systems executed by the virtual machine instances, as well as any number of additional organizational criteria. As will be explained in greater detail below, a virtual machine manager, such as the ONM system manager 110 can manage the performance of virtual machine network security assessments on sets of the virtual machine instances 107A-107N in response to requests from various client computing systems 145 or in response to the determination of an event, including the modification of virtual machine instances and the instantiation of new virtual machine instances. Additionally, the ONM system manager 110 can implement various processing and data collection techniques in response to the determination of an event.

Figure 10:
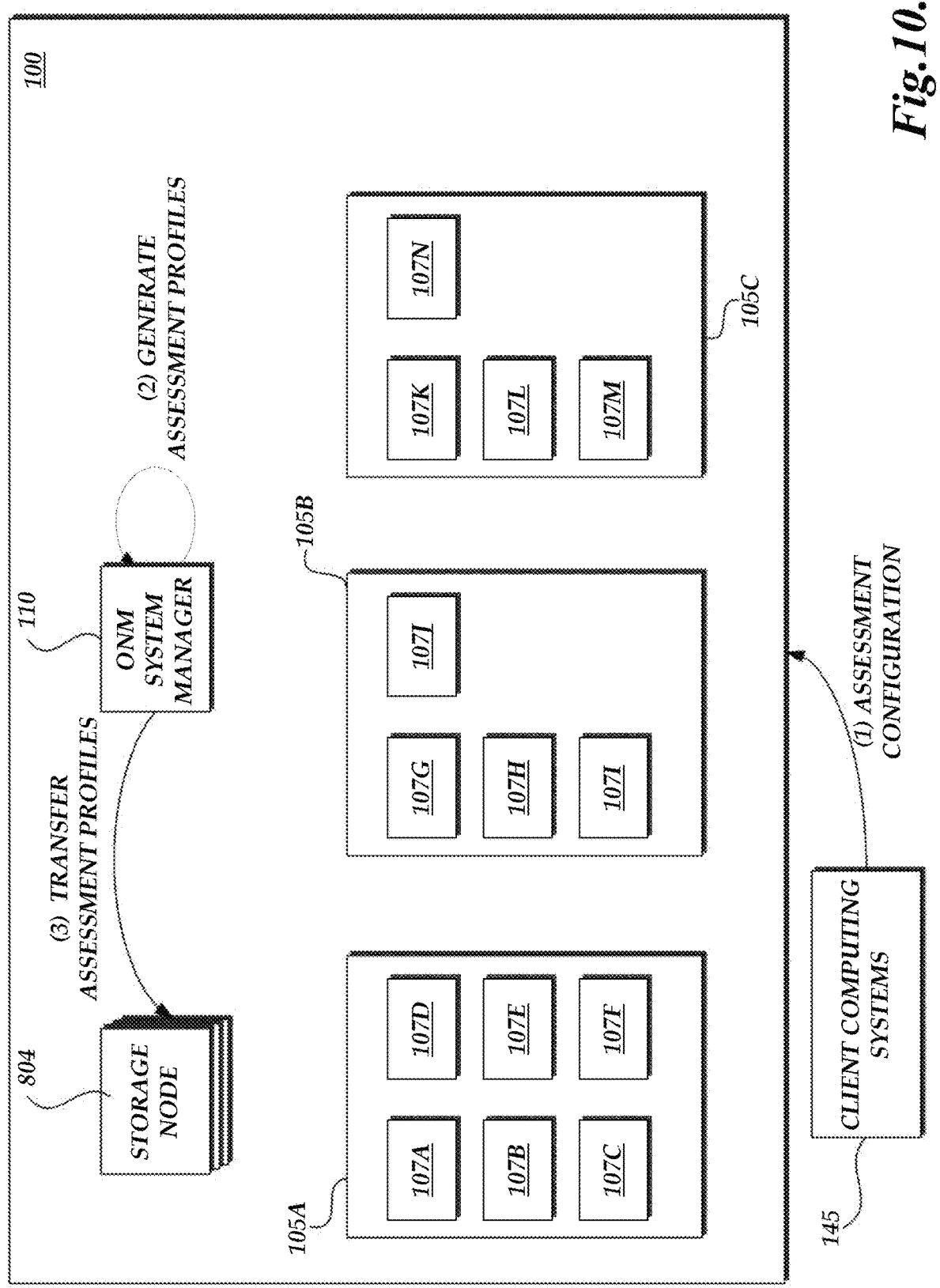
FIG. 10 is a block diagram of the simplified substrate network of FIG. 9 illustrating hosted virtual machine networks configuring virtual machine network security assessments.

With reference now to FIG. 10, an illustrative embodiment for configuring virtual machine network security assessments will be described. The ONM system manager 110 begins by obtaining a virtual machine network assessment configuration from the client computing systems 145. Illustratively, the assessment configuration may correspond to security assessment configuration information including the identification of, or configuration of, security assessment events, assessment extents, assessment types, or assessment timings, as well as any number of additional types of security assessment configuration information as discussed further with reference to FIG. 14. Additionally, the assessment configuration can include the selection of criteria that will be utilized by the ONM system manager 110 to generate assessment events for a specified virtual machine network. One skilled in the relevant art will appreciate that the virtual machine assessment configuration may be obtained from the client computing systems 145 via a client computing device interface or other means described above with respect to FIG. 8.

The ONM system manager 110 can process the virtual machine network assessment configuration to generate one or more assessment profiles. In one embodiment, an assessment profile may contain information or executable code associating the assessment profile with a security assessment event or describing one or more assessment preferences.

In one aspect, security assessment events may include events corresponding to activities associated with the execution of a virtual network. In another aspect, security assessment events may include requests for execution of specific virtual machine network activities. Specifically, for the purpose of example, activities associated with security assessment events may include but are not limited to requests for or the execution of: specific network or virtual machine instance transactions; changes in network activity or traffic to a set of virtual machine instances or ports; opening or closing a network port; the addition or removal of a set of virtual machine instances; changes in configuration of a set of virtual machine instances; the joining or leaving of a hardware device on the virtual machine network; the reboot, shut down, or power on of a virtual machine instance or physical computing system; the installation or removal of a software package or application; requests for security assessments; the identification or determination of new internal or external security threats; the modification of a security posture value representing the likelihood of system vulnerability or attack; and/or time defined activities, such as the change of a timer value associated with the virtual machine network generally or with a specific set of virtual machine instances. It will be appreciated by one skilled in the relevant art that a security assessment event may correspond to one or a combination of these activities. For example, a security assessment event may be defined as a request for installation of a specific software package when a security posture value representing the likelihood of system attack is over a predetermined threshold.

Assessment preferences may include various categories of configuration information, including but not limited to assessment timing information, assessment type information, and assessment extent information, as will be explained in greater detail below with respect to FIG. 14. Referring back to FIG. 10, the ONM system manager 110 may cause the generated assessment profiles to be stored in storage nodes 804 for future use.

Figure 11A:
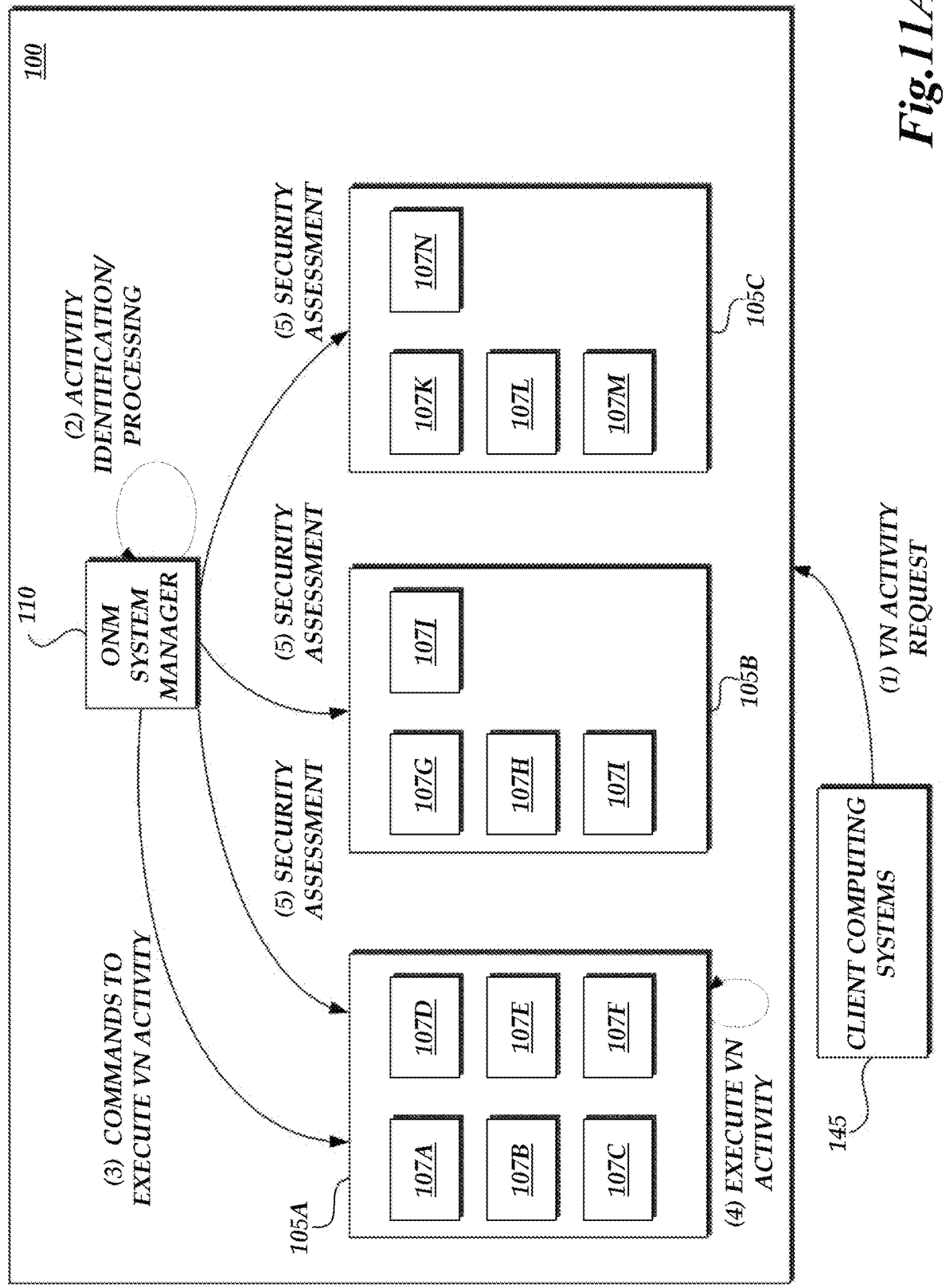
FIGS. 11A and 11B are block diagrams of the simplified substrate network of FIG. 9 illustrating hosted virtual machine networks performing virtual machine network security assessments.
Figure 11B:
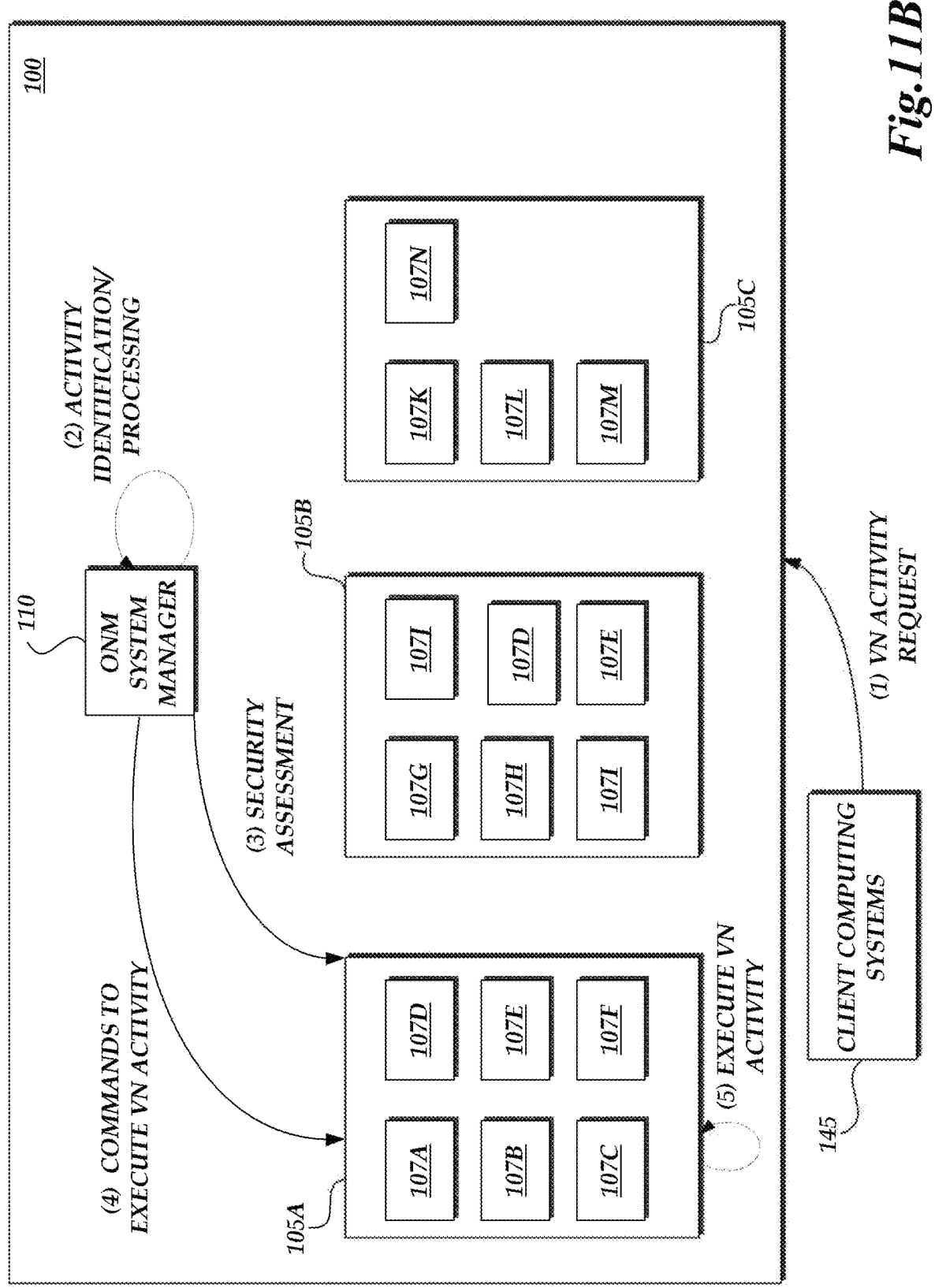

FIGS. 11A and 11B illustrate example embodiments of virtual machine security assessments within an illustrative hosted virtual machine network. FIG. 11A illustrates a virtual machine network security assessment across multiple sets of virtual machine instances 107A-107N hosted on three physical computing systems 105A, 105B, 105C. For the purpose of illustration, the ONM system manager 110 can monitor for security assessment events, such as requests for execution of a virtual machine network activity or activity associated with the execution of a virtual network activity. These security assessment events may be associated with one or more assessment profiles as described above with respect to FIG. 10. Illustratively, the ONM system manager 110 may respond to a detected activity associated with a security assessment event by causing the performance of a virtual machine network security assessment. Under some embodiments, the ONM system manager 110 may cause the performance of a security assessment or vulnerability scan subsequent or simultaneous to a virtual machine instance execution in order to determine whether the execution has introduced or contributed to system vulnerabilities. Under other embodiments, the virtual machine manager may delay execution of an activity or request for execution until after a security assessment is performed. Additionally, under various embodiments the ONM system manager 110 may prevent, delay, or reverse the execution of a virtual machine network activity or request for execution pending the results of a security assessment.

Referring back to FIG. 11A, the ONM system manager 110 begins by obtaining a virtual machine network activity request from the client computing systems 145. The ONM system manager 110 can process the virtual machine network activity request to determine whether it corresponds to a security assessment event or can be classified as a security assessment event. In another embodiment, the ONM system manager 110 can monitor the execution of the virtual machine instances for activities that may rise to a detected security assessment event. In one aspect, the determination of a security assessment event can be automatic based on one or more stored assessment profiles associated with a virtual machine network. In another aspect, the determination of a security assessment event may be dynamic in nature based on various criteria maintained by the ONM system manager 110. Illustratively, a virtual machine network may be associated with multiple assessment profiles corresponding to different security assessment events. For example, a detected activity or request may not correspond to a security assessment event for one assessment profile, but may correspond to one or more security assessment event for other assessment profiles associated with the same virtual machine network. A security assessment event may additionally require manual verification or manual initiation from an administrator associated with the substrate network 100 or an administrator associated the set of virtual machine instances at issue. In another embodiment, security assessments may be triggered automatically or on a continuous basis.

For purposes of illustration, assume that the virtual machine network activity request obtained by the ONM system manager 110 corresponds to a security assessment event. Accordingly, the ONM system manager 110 can process the activity request to determine the corresponding security assessment event as described above. The ONM system manager 110 may determine assessment preferences associated with the determined security assessment events based on assessment profiles or other criteria maintained by the ONM system manager 110. In some embodiments, the ONM system manager 110 can optionally determine whether the virtual machine network activity corresponding to the activity request should be executed before or after a security assessment has been run.

Referring back to FIG. 11A, for purposes of illustration, assume that the virtual machine network activity request corresponds to execution of one or more instances of the set of virtual machine instances 107A-107F. Accordingly, the ONM system manager 110 can cause the execution of one or more instances of the set of virtual machine instances 107A-107F. The ONM system manager 110 may then cause the performance of a security assessment on a set of virtual machine instances 107A-107N hosted on physical computing systems 105A, 105B, 105C.

As previously described, the timing, extent, and type of the security assessment may illustratively be based on assessment preferences associated with one or more assessment profiles, or may be dynamically determined based on based on various criteria maintained by the ONM system manager 110. As illustrated in FIG. 11A, for purposes of example, the ONM system manager 110 causes a security assessment on all virtual machine instances within the virtual machine network as a safeguard measure in parallel with the requested or detected network activity. In an alternate aspect, the ONM system manager may cause a security assessment only on specific sets of virtual machine instances within the virtual machine network. One skilled in the relevant art will additionally appreciate that the set of assessed virtual machine instances may be hosted by one or more physical computing systems 105. The timing of the instantiation of the security assessment may correspond to the type of assessment or type of activity that is requested or detected. Accordingly, the timing of the security assessment can occur in parallel or asynchronously from the addition of the network component. One skilled in the relevant art will appreciate, however, that the components targeted by a security assessment, the type of assessment performed, and the timing of the security assessment can be separately configured.

FIG. 11B illustrates a targeted virtual machine network security assessment across a set of virtual machine instances 107A-107N hosted on a physical computing system 105A. As previously described, the ONM system manager 110 can process the virtual machine network activity request to determine whether the activity corresponds to one or more security assessment events. In another embodiment, the ONM system manager 110 can monitor the execution of the virtual machine instances for activities that may rise to one or more security assessment events. For purposes of illustration, assume that the virtual machine network activity request obtained by the ONM system manager 110 corresponds to a security assessment event. Accordingly, the ONM system manager 110 can process the activity request to determine the corresponding security assessment event as described above with reference to FIG. 11A.

The ONM system manager 110 may obtain assessment profiles or assessment preferences associated with the determined security assessment event. As previously described, the ONM system manager 110 can determine whether the virtual machine network activity corresponding to the activity request should be executed before or after a security assessment has been performed or otherwise such that the activity request is synchronous with the completion of the security assessment. For purposes of illustration, in the example interaction of FIG. 11B, assume that the ONM system manager 110 determines that a security assessment should be performed before execution of the virtual machine network activity corresponding to the activity request. Additionally, assume that the assessment preferences of the relevant assessment profile indicate that the ONM system manager 110 should cause a targeted security assessment on a set of virtual machine instances 107A-107F. As illustrated, the ONM system manager 110 conducts the targeted security assessment prior to causing the execution of the virtual machine network activity corresponding to the network request. In another embodiment, the ONM system manager 110 can further determine whether to cause execution of the virtual machine network activity based on feedback regarding the results of the security assessment. For the purposes of illustration, this determination can be based on various security criteria including the success of a particular set of tests performed as part of the security assessment, whether the security assessment uncovers a certain number or combination of virtual machine network vulnerabilities, a security threat level value based on an assessment of potential threats and vulnerabilities, whether an aggregate security value based on the results of the security assessment crosses a threshold value, among others. As previously discussed, although FIG. 11B illustrates a targeted security assessment that occurs prior to executing the activity, one skilled in the relevant art will appreciate that the components targeted by a security assessment, the type of assessment performed, and the timing of the security assessment can be separately configured.

In still another embodiment, the ONM system manager 110 can cause the instantiation of a new set of virtual machine instances in order to perform one or more security assessments without affecting the state or performance of an extant virtual machine network (not shown). For the purpose of illustration, this new set of virtual machine instances may be configured with unique settings, or may be instantiated with settings and state corresponding to an existing set of virtual machine instances. The ONM system manager 110 can cause the execution of the new set of virtual machine instances and cause the performance of a security assessment on this new set of virtual machine instances to test for possible vulnerabilities. In one aspect, for the purpose of example, the ONM system manager 110 may cause performance of a security assessment on the new set of virtual machine instances before or after determining whether to cause the execution of a corresponding set of existing virtual machine instances. In another aspect, the ONM system manager may remove or delete one or more members of a new or existing set of virtual machine instances from the virtual machine network based on the results of the security assessment. These determinations may be based on various security criteria as described above.

In yet another embodiment, the ONM system manager 110 can identify and isolate a set of virtual machine instances before execution of the set of virtual machine instances. Specifically, for the purpose of example, isolation may include preventing contact or limiting access between any virtual machine instance associated with the identified set of virtual machine instances and other virtual machine instances or communication networks. The ONM system manager 110 may cause the performance of a security assessment on the isolated set of virtual machine instances to test for possible vulnerabilities before determining whether to restore the set of virtual machine instances. This determination may be based on various security criteria as described above.

Figure 12:
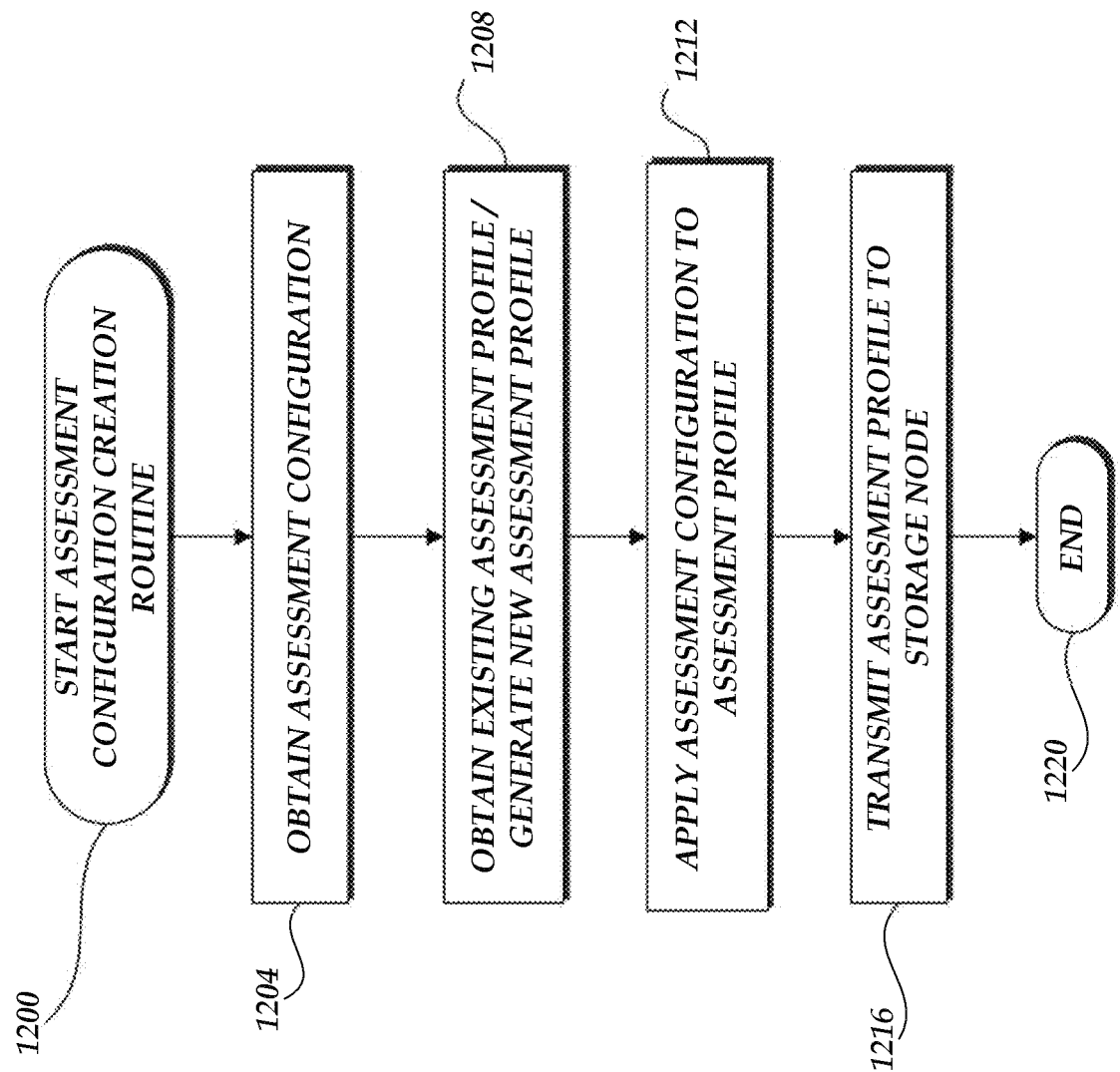
FIG. 12 is a flow-diagram illustrative of a virtual machine network security assessment configuration routine implemented by a virtual machine network manager.

With reference now to FIG. 12, a flow diagram illustrative of a virtual machine network security assessment configuration routine 1200 executed by a virtual machine manager, such as ONM system manager 110 of FIG. 10, will be described. Illustratively, routine 1200 can be implemented upon determination of a virtual machine network configuration event, or upon receipt of a configuration request from the client computing systems. At block 1204, the ONM system manager 110 obtains an assessment configuration. This assessment configuration may be dynamically generated in response to a virtual machine network configuration event, or may be obtained from an assessment configuration request. Illustratively, the assessment configuration may correspond to one or more security assessment events and assessment preferences including assessment extents, assessment types, assessment timings, as well as any number of additional types of security assessment configuration information as discussed below with reference to FIG. 14.

At block 1208, the ONM system manager 110 obtains an assessment profile. In one aspect, the ONM system manager 110 may obtain an existing assessment profile to update with the configuration information. Illustratively, this existing assessment profile may be obtained from a variety of sources such as storage nodes 804 of FIG. 10, the memory of the ONM system manager 110, or any other type of storage device or cache source. In another aspect, the ONM system manager 110 may generate a new assessment profile. As discussed above with reference to FIG. 10, an illustrative assessment profile may contain information or executable code associating the assessment profile with a security assessment event or describing one or more assessment preferences. At block 1212, the ONM system manager 110 applies the assessment configuration to the assessment profile. Illustratively, applying an assessment configuration to an assessment profile may include modifying one or more values or associations of the assessment profile to reflect configuration information included in the assessment configuration. This may include various modifications to the assessment profile such as associating an assessment profile with a new security assessment event, or changing an assessment profile's assessment preference information, among a variety of others. At block 1216, the ONM system manager 110 transmits the assessment profile to storage nodes 804. It will be appreciated by one skilled in the relevant art that storage nodes 804 may correspond to one or more physical or logical storage devices, and that one or more copies of an assessment profile may be stored. The virtual machine network security assessment configuration routine ends at block 1220.

Figure 13:
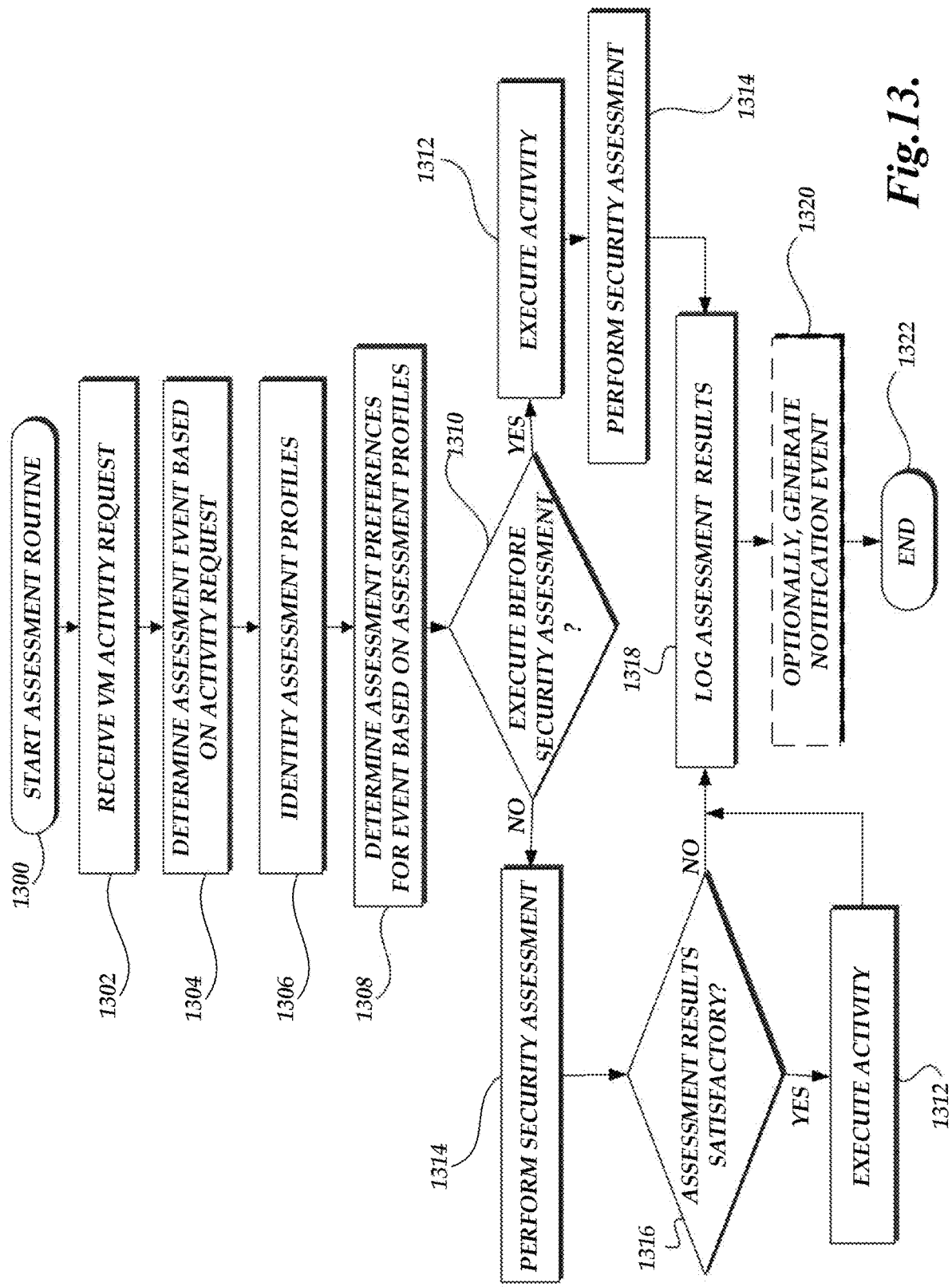
FIG. 13 is a flow-diagram illustrative of a virtual machine network security assessment routine implemented by a virtual machine network manager.

With reference now to FIG. 13, a flow diagram illustrative of a virtual machine network security assessment routine 1300 executed by a virtual machine manager, such as ONM system manager 110 of FIG. 10, will be described. The routine 1300 may begin at block 1302 with a request for execution of a virtual machine network activity. Illustratively, this request may be generated from a client computing system or other source. At block 1304 the ONM system manager 110 may determine a security assessment event based on the virtual machine activity request. In another embodiment, the ONM system manager 110 may determine a security assessment event based on a detected activity associated with the execution of the virtual machine network.

At block 1306 the ONM system manager 110 may identify one or more assessment profiles. Illustratively, the assessment profiles may be obtained from a variety of sources as described above with reference to FIG. 12, and identified based on their association with the determined security assessment event. At block 1308 the ONM system manager 110 may determine assessment preferences for the security assessment event. Illustratively, these assessment preferences may be dynamically determined by the ONM system manager 110 or associated with an assessment profile. Assessment preferences may correspond to assessment types, assessment extents, and assessment timings as discussed below with reference to FIG. 14, as well as any number of additional kinds of security assessment configuration information. In one embodiment, the ONM system manager 110 may be configured to dynamically determine assessment preferences based on obtained external information concerning security vulnerabilities. For the purposes of illustration, the ONM system manager 110 may obtain information on threats or traffic patterns local or external to the virtual machine network, or may base its determination on security information provided by third parties.

Returning to FIG. 13, at block 1310, the ONM system manager 110 determines whether the virtual machine network activity associated with the request should be executed before or after the performance of a security assessment. Illustratively, this determination may be based on assessment preferences such as assessment timing, or on other criteria maintained by the ONM system manager 110. The timing of the instantiation of the security assessment may correspond to the type of assessment or type of activity that is requested or detected. For example, an assessment profile may indicate that the addition of a new network component to the virtual machine network would trigger a security assessment for all of the components associated with the virtual machine network as a safeguard measure. Accordingly, the timing of the security assessment can occur in parallel or asynchronously from the addition of the network component.

If the ONM system manager 110 determines that the security assessment should be performed before the execution of the requested activity, the routine 1300 proceeds to block 1314 and the ONM system manager 110 causes the performance of a security assessment. Illustratively, this security assessment may be performed by a number of components of the virtual machine network, including but not limited to the ONM system manager 110, other systems of the virtual machine network, or any combination of third-party hardware or software. For the purposes of illustration, security assessment procedures may include procedures for performing security assessments, such as vulnerability scans, on any of various types of virtual network assets such as physical computing systems and devices, virtual machine instances, and virtual machine network configurations, among others. Specifically, for purposes of example, security assessment procedures may include procedures such as computer virus scans, tests against known exploits, software bug detection, input and validation checking, load testing, and the identification of flaws in hardware or software design or implementation, password handling, or privilege management, among a variety of others.

In one aspect, assessment procedures may have no effect on the set of virtual machine instances being scanned or assessed. In an alternate aspect, assessment procedures may change or destructively affect the internal configuration, data, or state of the set of virtual machine instances being scanned or assessed. For example, an assessment type may specify a thorough test of known exploits against a virtual machine instance that may modify or destroy some of the internal data of the virtual machine instance.

In another embodiment, the ONM system manager 110 may be configured to store the results of a security assessment along with a record of the associated security assessment event. The ONM system manager 110 may then subsequently obtain the stored results of a previous security assessment associated with a security assessment event rather than cause the performance of a new security assessment. Illustratively, the storage of security assessment results may allow the ONM system manager 110 to quickly and efficiently obtain assessment results in situations where a similar or identical assessment has previously been performed. Specifically, in an illustrative embodiment, the ONM system manager 110 may store the results of a security assessment performed on a newly instantiated virtual machine instance along with the associated virtual machine configuration or request to instantiate a new instance. For purposes of this example, the ONM system manager 110 may then obtain the stored results of the previous security assessment rather than cause the performance of a new assessment when a later request to instantiate a similar machine is detected.

Under one embodiment, the stored results of a security assessment may be associated with an expiration time or date. Illustratively, ONM system manager 110 may discard expired stored security assessment results when a triggering security assessment event is detected and cause the performance of a new security assessment to ensure that any stored results are accurate and valid under current network conditions. It will be appreciated that expiration times or dates may be associated with all or any subset of stored security assessment results. Expiration dates may be consistent or may vary across any combination of security assessment results, and may be determined dynamically or on the basis of one or more preconfigured values. It will further be appreciated that security assessment results may be stored at storage nodes 804 in FIG. 10 or any other combination of storage locations including at client computing systems 145. Assessment results may be stored for all or any subset of possible activities, requests, or security assessment events. In some embodiments, security assessment results may be associated with security assessment events, or may be associated with one or more properties or configurations associated with a virtual network request.

At block 1316 the ONM system manager 110 determines whether the results of the security assessment are satisfactory. In one embodiment, this determination may be based on various security criteria including the success of a particular set of tests performed as part of the security assessment, whether the security assessment identifies a certain number or combination of virtual machine network vulnerabilities, a security threat level value based on an assessment of potential threats and vulnerabilities, whether an aggregate security value based on the results of the assessment crosses a threshold value, among others. If the assessment results are satisfactory, the ONM system manager 110 proceeds to block 1312 and causes the execution of the requested virtual machine network activity.

Returning to block 1310, if the ONM system manager 110 determines that the requested activity should be executed before the performance of the security assessment, the routine proceeds to block 1312 and the ONM system manager 110 causes the execution of the requested virtual machine network activity. At block 1314 the ONM system manager 110 causes the performance of a security assessment. This security assessment may be performed before, after, or simultaneous with the execution of the requested virtual machine network activity as described above with reference to FIG. 11A.

At block 1318 the ONM system manager 110 logs the assessment results. Illustratively these result logs may be stored at storage nodes 804 in FIG. 10 or any other combination of storage locations including at client computing systems 145. In one embodiment, these logs may be generated or updated dynamically to reflect the results of frequent or continuous security assessments. Optionally, the ONM system manager 110 may generate an assessment notification event at block 1320. In one embodiment, this assessment notification event may cause information to be provided to a user, including result logs, notifications that user action is required, or any other information based on the results of a security assessment.

The ONM system manager may additionally cause the user to be charged a fee (not shown) for the provision of a log or notification. In one embodiment, a security assessment may be performed automatically or continuously, but a user may be required to pay a fee in order to obtain a report of the results of the security assessment. In another embodiment, a user may be charged a fee on a per security assessment basis. Illustratively, this fee may vary based on a number of factors, including the extent, type, and timing of the security assessment, the user's service contract, and other criteria associated with the user, virtual machine network, or security assessment. In still another embodiment, a virtual machine network host may pay or reward a user for receiving regular security assessments. For example, users may be given a discount in the price of hosting if they submit to regular security assessments to ensure the security of their virtual network configuration.

In an additional embodiment, the ONM system manager may further take a corrective action based on the results of the security assessment (not shown). For purposes of illustration, this action may include any action to notify, modify, correct, isolate, or reveal any aspect of the virtual machine network based on the results of the security assessment. The routine ends at block 1322.

Figure 14:
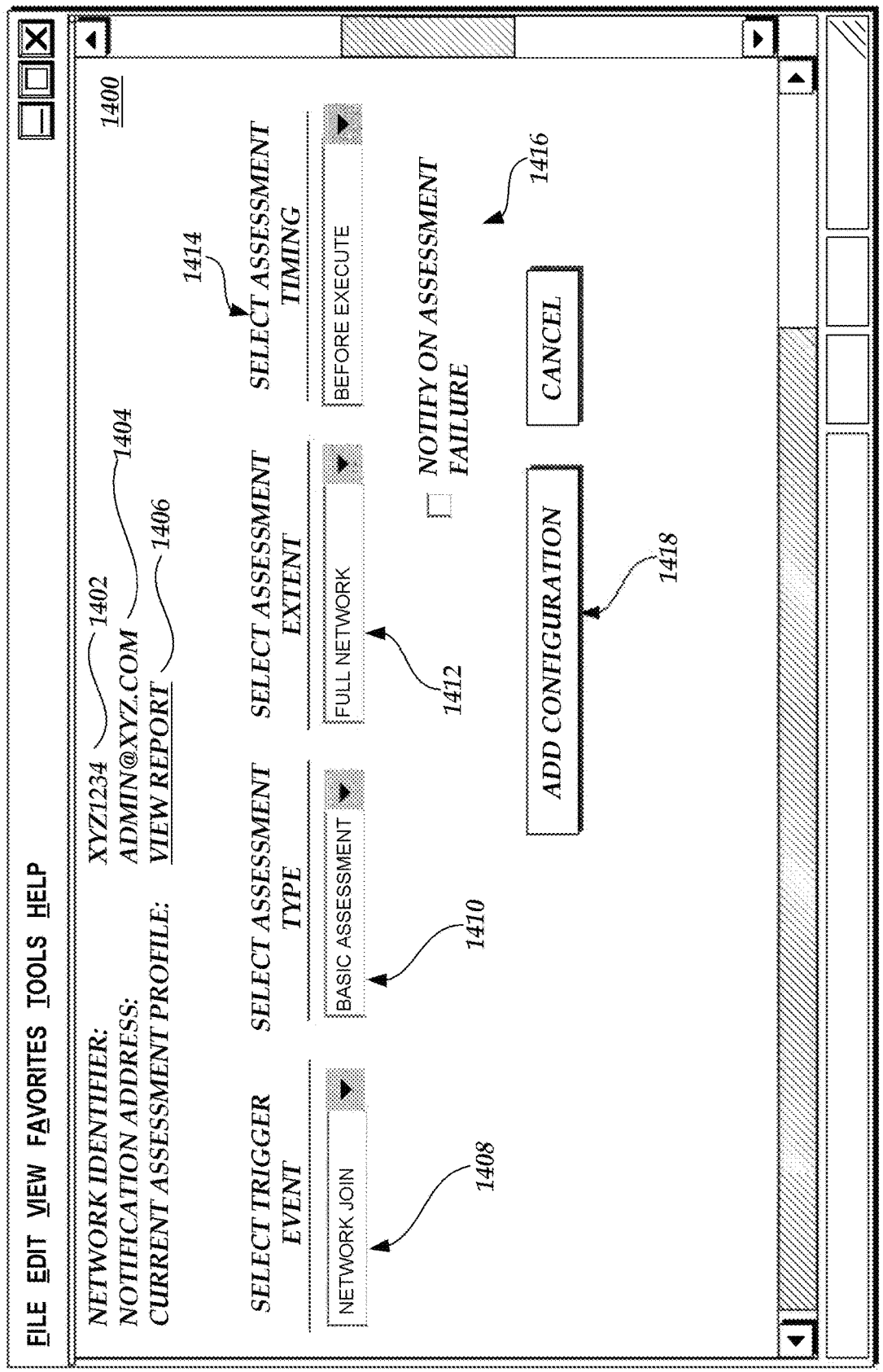
FIG. 14 illustrates an exemplary user interface that may be used to define an assessment configuration.

With reference now to FIG. 14, an illustrative embodiment of a user interface 1400 for defining an assessment configuration will be described. The user interface 1400 may contain a network identifier 1402 identifying the virtual machine network that the assessment configuration is being defined for. The user interface 1400 may additionally include a notification address 1404 where user notifications may be provided as described above with reference to FIG. 13. The user interface 1400 may further include a link 1406 to a current assessment profile detailing current security assessment configuration information.

The user interface 1400 may further include an assessment event dropdown 1408 or other means for selecting a security assessment event associated with the assessment configuration. Security assessment events may be defined for any type of activity associated with the execution of the virtual machine network or request for execution of a virtual machine network activity, as described above with reference to FIG. 10

The user interface 1400 may further include an assessment type dropdown 1410 or other means for selecting a security assessment type assessment preference associated with the assessment configuration. An assessment type may correspond to any number of security assessment procedures. Illustratively, these security assessment procedures may be implemented and designed by the host of the virtual machine network, a user of one or more virtual machine instances within the virtual machine network, or a third party provider of assessment or scanning tools, among others.

In one embodiment, these security assessment procedures may include vulnerability scans or any procedure intended to potentially reveal or identify a vulnerability or configuration state of a virtual machine network asset, where a vulnerability may be understood as any weakness in design, implementation, operation, or internal control. For the purposes of illustration, security assessment procedures may include procedures for assessing any of various types of virtual network assets such as physical computing systems and devices, virtual machine instances, and virtual machine network configurations, among others. Specifically, for purposes of example, security assessment procedures may include procedures such as computer virus scans, tests against known exploits, software bug detection, input and validation checking, load testing, and the identification of flaws in hardware or software design or implementation, password handling, or privilege management, among a variety of others.

In one aspect, performance of a set of security assessment procedures may have no effect on the set of virtual machine instances being assessed. In an alternate aspect, assessment procedures may change or destructively affect the internal configuration, data, or state of the set of virtual machine instances being assessed. For example, an assessment type may specify a thorough test of known exploits against a virtual machine instance that may modify or destroy some of the internal data of the virtual machine instance. Illustratively, these destructive assessment procedures may allow for rigorous security assessments or vulnerability testing without affecting the configuration of the virtual machine network when performed on sets of virtual machine instances being removed from the virtual machine network, or on sets of virtual machine instances specifically instantiated for testing purposes.

The user interface 1400 may further include an assessment extent dropdown 1412 or other means for selecting a security assessment extent assessment preference associated with the assessment configuration. An assessment extent may specify any number of sets of virtual machine instances or network assets to assess. In one embodiment, sets of virtual machine instances to assess may be predetermined by a user or administrator. In another embodiment, sets of virtual machine instances may be determined dynamically based on criteria related to each of the sets of virtual machine instances. Illustratively, these criteria may include any property of hardware, software, or activity associated with the set of virtual machine instances. For example, these criteria may include a hardware profile of the physical computing systems hosting one or more virtual machine instances within the set of virtual machine instances, a software profile of the set of virtual machine instances, an activity or volume of activity associated with the set of virtual machine instances, or various other criteria. It will be appreciated by one skilled in the relevant art that an assessment extent may be defined to correspond to one or a combination of these criteria or predetermined sets. For example, an assessment extent may include a first predetermined set of virtual machine instances along with a second dynamically determined set of all virtual machine instances receiving more than a specified average volume of network traffic and hosted on a physical computing system with a particular brand of hardware network interface card.

It will further be appreciated by one skilled in the relevant art that an assessment extent may include a currently operational set of virtual machine instances, or may specify a new instantiation of a set of virtual machine instances. For example, a current set of virtual machine instances may be duplicated for the purposes of testing, and the duplicates may be removed once testing is complete to avoid affecting the state or data of the virtual machine network.

The user interface 1400 may further include an assessment timing dropdown 1412 or other means for selecting a security assessment timing assessment preference associated with the assessment configuration. An assessment timing may specify when to cause the performance of a security assessment. For the purposes of illustration, an assessment timing may specify an absolute amount of time to wait or an order of operations relative to the execution of a particular event. For example, an assessment timing may specify that a security assessment is to be performed before, after, or simultaneous to the execution of the activity associated with the security assessment event. In one embodiment, an assessment timing may additionally specify that the execution of the activity associated with the security assessment event is to be delayed, or is contingent on the results of the security assessment.

The user interface 1400 may further include a notify on security assessment failure check-box 1416 or other means for indicating a request for a user notification as described above with reference to FIG. 13. The user interface 1400 may additionally include an add configuration button 1418. For purposes of illustration, the add configuration button may cause the ONM system manager 110 to obtain a virtual machine network assessment configuration from the client computing systems 145 as discussed above with reference to FIG. 10.

It will be appreciated by one skilled in the relevant art that a network system manager can be configured to manage security assessments in response to any network activity, request, or event discussed in the description of the virtual machine network above, and further may be configured to respond to any of a variety of other network activities, requests, or events available to a network system manager under various other configuration of virtual or programmatically controlled networks. It will be further appreciated by one skilled in the relevant art that the above embodiment and description of the invention in the context of a virtual machine network is provided for purposes of illustration only and that in accordance with aspects of the present disclosure the current invention can be implemented on any programmatically controlled network capable of providing network events to a network system manager. In some embodiments, for the purpose of example, the present invention can be implemented on any combination of hardware and software providing for detection of requests, events, or activities associated with the modification or execution of network resources. In some aspects, these network requests, events, and activities may be available to service providers, users or customers, or administrators of a virtual or programmatically controlled network. In other aspects these network requests, events, and activities may only be available or detectable by a service provider, and may not be available or detectable by a user or customer of the programmatically controlled network. In various embodiments, aspects of hardware and software implementing this invention may be provided by a network service provider, a network service provider customer, or any third-party provider of computing devices, software, or computing services.

It will be appreciated by those skilled in the art and others that all of the functions described in this disclosure may be embodied in software executed by one or more processors of the disclosed components and communications devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer implemented method for managing a virtual machine network comprising:
   detecting an execution activity associated with execution of a virtual machine instance or a request for executing an execution activity on the virtual machine instance, wherein the execution activity is related to execution on an already fully-instantiated virtual machine instance;
   determining an execution security assessment event from a plurality of execution security assessment events based, at least in part, on the detected execution activity or requested execution activity; and
   causing performance of a security assessment on the virtual machine instance based, at least in part, on the determined execution security assessment event and based on at least one respective assessment preference, wherein causing performance of the security assessment comprises causing performance of the security assessment at least one of before, after, or simultaneous to the execution activity associated with the execution security assessment event.

2. The method of claim 1, wherein the at least one respective assessment preference includes at least one of a respective assessment timing, assessment type, or assessment extent.

3. The method of claim 1 further comprising causing instantiation of a set of virtual machine instances in order to perform the security assessment.

4. The method of claim 3, wherein the security assessment is performed on the set of virtual machine instances without affecting a state or performance of the virtual machine network.

5. The method of claim 1, wherein the causing performance of the security assessment includes causing performance of procedures corresponding to at least one of computer virus scans, tests against known exploits, software bug detection, input and validation checking, load testing, and the identification of flaws in hardware or software design or implementation, password handling, or privilege management.

6. The method of claim 1 further comprising storing results of the security assessment.

7. The method of claim 1 further comprising determining whether results of the security assessment are satisfactory.

8. The method of claim 7, wherein determining whether the results of the security assessment are satisfactory is based on at least one of a success of a particular set of tests performed as part of the security assessment, whether the security assessment identifies a certain number or combination of virtual machine network vulnerabilities, a security threat level value based on an assessment of potential threats and vulnerabilities, or whether an aggregate security value based on the results of the assessment crosses a threshold value.

9. A system comprising:
a data store configured to at least store computer-executable instructions; and
a hardware processor in communication with the data store, the hardware processor configured to execute the computer-executable instructions to at least:
determine an execution security assessment event from a plurality of execution security assessment events based, at least in part, on a detected execution activity or execution request for the execution activity, wherein the execution activity is related to execution on an already instantiated virtual machine instance; and
cause performance of a security assessment on the virtual machine instance at least one of before, after, or simultaneous to the execution activity associated with the execution security assessment event based, at least in part, on the determined execution security assessment event and based on at least one respective assessment preference.

10. The system of claim 9, wherein the hardware processor is further configured to generate one or more results of the security assessment.

11. The system of claim 10, wherein the hardware processor is further configured to cause at least one corrective action based on the one or more results of the security assessment.

12. The system of claim 11, wherein the at least one corrective action includes at least one action to notify, modify, correct, isolate, or reveal any aspect of a virtual machine network that includes the already instantiated virtual machine instance.

13. The system of claim 10, wherein the one or more results of the security assessment are associated with respective expiration time or date.

14. The system of claim 9, wherein the hardware processor is further configured to charge a user a fee for causing performance of the security assessment.

15. The system of claim 14, wherein an amount of the fee is based on a type of the security assessment performed.

16. A non-transitory computer-readable medium storing computer executable instructions that when executed by a processor perform operations comprising:
detecting an execution activity on a virtual machine instance or a request for executing the execution activity on the virtual machine instance, wherein the execution activity is related to execution on a fully-instantiated virtual machine instance;
determining an execution security assessment event from a plurality of execution security assessment events based, at least in part, on the detected execution activity or request; and
causing performance of a security assessment on the virtual machine instance based, at least in part, on the determined execution security assessment event and based on at least one respective assessment preference, wherein causing performance of the security assessment comprises causing performance of the security assessment at least one of before, after, or simultaneous to the execution of the activity associated with the execution security assessment event.

17. The non-transitory computer-readable medium of claim 16, wherein the operations further comprise obtaining external information concerning security vulnerabilities.

18. The non-transitory computer-readable medium of claim 17, wherein the at least one respective assessment preference is determined based, at least in part, on the external information concerning security vulnerabilities.

19. The non-transitory computer-readable medium of claim 16, wherein the operations further comprise rewarding a user for the performance of the security assessment.

* * * * *